United States Patent
Sakai et al.

[11] Patent Number: 5,945,973
[45] Date of Patent: Aug. 31, 1999

[54] POSITION READER

[75] Inventors: Yasuo Sakai, Hiratsuka; Yutaka Tsureta; Tetsuya Suzuki, both of Chigasaki; Tsuyoshi Shiobara, Yokohama, all of Japan

[73] Assignee: HItachi, Ltd., Tokyo, Japan

[21] Appl. No.: 08/643,458

[22] Filed: May 8, 1996

[30] Foreign Application Priority Data

May 12, 1995 [JP] Japan ................................ 7-114855
Nov. 29, 1995 [JP] Japan ................................ 310863

[51] Int. Cl.$^6$ .................................................. G09G 3/36
[52] U.S. Cl. ........................... 345/104; 345/179; 345/173
[58] Field of Search .................................. 345/179, 104, 345/173, 174, 156; 178/18, 19; 349/12

[56] References Cited

U.S. PATENT DOCUMENTS

| | | | |
|---|---|---|---|
| 5,357,266 | 10/1994 | Tagawa | 345/104 |
| 5,367,130 | 11/1994 | Isono | 178/18 |
| 5,410,389 | 4/1995 | Tagawa et al. | 345/104 |
| 5,638,089 | 6/1997 | Takemoto | 345/104 |

FOREIGN PATENT DOCUMENTS

| | | |
|---|---|---|
| 0 544 300 A1 | 6/1993 | European Pat. Off. . |
| 0 571 230 A1 | 11/1993 | European Pat. Off. . |
| 62-290921 | 12/1987 | Japan . |
| 4-352219 | 7/1992 | Japan . |
| 5-53716 | 3/1993 | Japan . |
| 5-150902 | 6/1993 | Japan . |
| 6-324787 | 11/1994 | Japan . |

*Primary Examiner*—Dennis-Doon Chow
*Attorney, Agent, or Firm*—Antonelli, Terry, Stout & Kraus, LLP

[57] ABSTRACT

A position reader having a display device and a tablet, and being provided with means for detecting an end of display period of the display screen to set a position read period for reading the position of a pen-down point on the tablet, means for masking (i.e., fixing) display drive signals of the display device, and means for directing the CPU to read a coordinate position of the pen-down point on the tablet; the pen-down point read period being provided outside the display period of the display screen. Noise caused by changes in levels of display drive signals can be prevented from occurring in the tablet, and therefore the coordinate of the pen-down point of a pen-down means on the tablet can be read with a good precision.

6 Claims, 16 Drawing Sheets

POSITION READER

BACKGROUND OF THE INVENTION

1. Field of the Invention

This invention relates to a position reader having a display device and an input means, and more particularly to a position reader having a display device such as a liquid-crystal display device, provided with a tablet.

2. Description of Related Art

In recent years, portable terminal units have employed liquid-crystal display devices as display means, where a tablet making use of resistance thin films is provided on a screen as an input means, and the surface of the tablet is pushed down with a pen, a finger or the like to perform input. As the prior art of a means for accurately reading this pen-down position on the tablet, for example, Japanese Patent Application Laid-open (KOKAI) No. 5-150902 discloses an example in which an STN (Super Twisted Nematic) type device is used as the liquid-crystal display device.

In the position reader having such a display device provided with a tablet on its screen, the tablet is constituted of a horizontal-direction transparent resistance film formed of a transparent resistance film and respectively provided with horizontal electrodes at opposing two sides in the direction of a horizontal coordinate axis, and a vertical-direction transparent resistance film also formed of a transparent resistance film and respectively provided with vertical electrodes at opposing two sides in the direction of a vertical coordinate axis, both films being put together to leave a given minute gap between them, and such a tablet is provided on the screen of the display device.

With such a constitution, an electric current flows to the horizontal-direction transparent resistance film extending between the two horizontal electrodes, and an electric current also flows to the vertical-direction transparent resistance film extending between the two vertical electrodes. The voltages across these electrodes (herein often "interelectrode voltages") are respectively detected, and separately fed to A/D (analog-to-digital) converters, where the signals are converted to digital data and fed to a CPU (central processing unit).

Now, assume that the surface of the tablet has been pushed down with a pen at an arbitrary position, the voltage across the two horizontal electrodes changes in accordance with the pen-down position in the horizontal axis direction on the tablet, and also the voltage across the two vertical electrodes changes in accordance with the pen-down position in the vertical axis direction on the tablet. The changes of these voltages are detected by the CPU on the basis of the digital data fed from the A/D converters, and a horizontal coordinate point and a vertical coordinate point at the pen-down position on the tablet are determined. Then, the CPU controls a display controller on the basis of the information of the horizontal and vertical coordinate points, so that picture elements at the position corresponding to the pen-down position of the tablet on the screen of the display device are driven to display the pen-down position.

FIG. 16, reference symbol (a), illustrates a screen of the display device. Its display area 101 is comprised of lines each formed of X dots in the horizontal direction, forming Y lines of lines Y0, Y1, . . . , Ymax arranged in the vertical direction. In order to display a picture in such a display area, a frame signal 301 and a horizontal scanning signal 105 (these signals and transfer signals of display data are hereinafter called display drive signals collectively) are fed to the display device.

This frame signal 301 is level-reversed for each frame period that is necessary for scanning the whole display area 101. Hence, in this case, the voltage of liquid-crystal display drive signals is alternated in one frame. The horizontal scanning signal 105 is also a pulse signal for successively driving the lines Y0, Y1, . . . , Ymax of the display area 101, and this enables all the lines Y0, Y1, . . . , Ymax to be successively driven in one frame period between the point in time of the level reversal of the frame signal 301 and the point in time of the next level reversal. Then, the display data of the whole dots of these lines are simultaneously fed to the lines Yi (i=1, 2, . . . , max) thus driven.

Now, in the position reader constituted as described above, electrostatic coupling is formed between the screen of the display device and the tablet. Such electrostatic coupling causes, as shown in FIG. 16, reference symbol (c), noise ascribable to the above display drive signals of the display device. More specifically, when the frame signal 301 and the horizontal scanning signal 105 are level-reversed, noise occurs concurrently therewith in the signals fed from the tablet, which occurs through the electrostatic coupling. This noise is significant especially at the point where the frame signal 301 changes, and such noise increases with an increase in the tablet area that becomes larger as the display device is made larger.

Once such noise has occurred, the noise disturbs the interelectrode voltages of the tablet, and the voltages thus disturbed are fed to the A/D converters, so that the CPU may perform erroneous positional detection.

Accordingly, in the art disclosed in the above Japanese Patent Application Laid-open (KOKAI) No. 5-150902, in order to prevent this noise so as to enable positional detection with good precision, the A/D converters are so designed as to accept the interelectrode voltages at the time when the level has become stable other than the timing at which the frame signal 301 and the horizontal scanning signal 105 are level-reversed.

Stated more specifically, the horizontal scanning signal 105 that drives the lines Y0, Y1, . . . , Ymax shown in FIG. 16, reference symbol (b), includes a plurality of pulses each having equal pulse widths which are outputted as Y0, Y1, . . . , Ymax at the falling edges of the respective signals. The frame signal 301 is formed by, e.g., counting the clock pulses of the signals. Since the levels of the frame signal 301 and horizontal scanning signal 105 are stable at positions posterior to the rising edges of clock pulses, the A/D converters are so designed as to utilize the rising edge of clock pulses to accept the interelectrode voltages of the tablet.

Thus, in order to read the output of the tablet at the timing where the levels of the frame signal 301 and horizontal scanning signal 105 are stable, the CPU first applies a voltage and, after the applied voltage has become stable, detects whether or not the tablet is in the state of pen-down. Thereafter, it applies a voltage to the tablet once more and, after this applied voltage has become stable, it detects the rising edges of the clock pulses and utilizes the rising edges of clock pulses to accept the output of the tablet through the A/D converters to detect the pen-down position of the tablet.

In the prior art as described above, in order to prevent noise from the liquid-crystal screen to the tablet, the CPU utilizes the rising edge of the horizontal scanning signal of the liquid-crystal screen to read the coordinate data while converting the output voltages of the tablet into digital form by means of the A/D converters. Hence, as a problem, the CPU must stop the processing of reading the coordinate data until the rising edges appear in the horizontal scanning signal 105 of the liquid-crystal screen even after the applied voltages fed to the tablet have become stable. It has not been taken into consideration to appropriate the CPU for other processing during the stop so that its throughput can be effectively utilized.

As another problem, without regard to whether or not the tablet is in the state of pen-down, the voltages are respectively, periodically, applied across the horizontal electrodes and across the vertical electrodes to cause electric currents to flow the horizontal and vertical transparent resistance films of the tablet so as to detect that the tablet is in the state of pen-down. Thus, it has not been taken into consideration to save the time and power consumption required for the CPU to detect that the tablet is in the state of pen-down.

As still another problem, immediately before the pen comes away from the surface of the tablet from a pen-down state (hereinafter called "pen-up motion"), the horizontal and vertical transparent resistance films respectively formed on the top surface and bottom surface of the tablet may come into insufficient contact or non-contact with each other, resulting in a significant lowering of the reliability of the coordinate data obtained at that point in time. This problem, however, has not been taken into consideration at all in the prior art described above.

SUMMARY OF THE INVENTION

Accordingly, a first object of the present invention is to provide a position reader that can solve the above problems and can effectively utilize the throughput of the CPU.

A second object of the present invention is to provide a position reader that can enjoy a significant reduction in power consumption.

A third object of the present invention is to provide a position reader that enables high-precision reading.

To achieve the first object, the position reader of the present invention is provided with a first means for detecting an end of display period of the display screen to set a position read period for reading the position of a pen-down point on the tablet, a second means for masking (i.e., fixing) display drive signals of the display device, and a third means for directing the CPU to read a coordinate position of the pen-down point on the tablet; the pen-down point read period being provided outside the display period of the display screen.

Thus, the display control signals are not fed to the display device during the position read period in the case when the tablet is superimposed on the display screen and the tablet and the display device are electrostatically coupled. Hence, noise caused by the changes in levels of the display drive signals never occur in the tablet, and therefore the coordinate of the point of pen-down on the tablet with a pen-down means can be read with good precision. Also, the CPU may read the pen-down position only in the position read period, and hence the CPU can be appropriated for other processing during the period other than that, so that its throughput can be effectively utilized.

To achieve the second object, the position reader of the present invention is provided with a first means for detecting a start of pen-down on the tablet with a pen-down means and detecting a change in electric currents flowing through the resistance films, the change occurring at an end of pen-down, and a second means for notifying the CPU of the start of pen-down or end of pen-down with the pen-down means in accordance with the result of detection made by the first means; the CPU being capable of i) reading the positional data of the point of pen-down on the tablet with the pen-down means by causing electric currents to flow to the respective resistance films, upon receipt of the notification from the second means in respect of the start of pen-down with the pen-down means, ii) performing an operation to process the data to determine the coordinate of the position of the pen-down point, and iii) upon completion of the reading of the positional data of the pen-down point or completion of the operation, entering a stand-by state for the next pen-down in the state where an electric current only flows to one of the resistance films.

Thus, only when the tablet is pushed down with the pen-down means, does the CPU cause electric currents to flow to both of the two resistance films constituting the tablet, and in that state it reads the data of the pen-down point on the tablet and performs an operation to determine the coordinate position thereof. When the pen-down means comes away from the surface of the tablet, the CPU stands by so as to detect the next pen-down on the tablet in the state in which the electric current only flows to one of the resistance films. Hence, when the pen-down means comes away from the surface of the tablet, the power to be fed to the tablet can be saved, making it possible to reduce power consumption.

To achieve the third object, the position reader of the present invention is also provided with a first means for detecting a change in electric currents flowing through the resistance films, the change occurring at a start of pen-down or end of pen-down on the tablet with a pen-down means, and a second means for notifying the CPU of the start of pen-down or end of pen-down with the pen-down means in accordance with the result of detection made by the first means; the CPU being capable of i) reading the positional data of the point of pen-down on the tablet with the pen-down means by causing electric currents to flow to the respective resistance films, upon receipt of the notification from the second means in respect of the start of pen-down with the pen-down means, ii) performing an operation to process the data to determine the coordinate of the position of the pen-down point, iii) upon completion of the reading of the positional data of the pen-down point or completion of the operation, entering a stand-by state for the next pen-down in the state where an electric current is caused to flow only to one of the resistance films, and iv) upon receipt of the notification from the second means of the start of pen-down with the pen-down means, stopping the reading of the positional data of the pen-down point while entering a stand-by state for the next pen-down in the state where an electric current is only caused to flow to one of the resistance films, and simultaneously cancelling the positional coordinate data of the pen-down point obtained immediately before that, as being ineffective.

Thus, like the invention for achieving the second object, it is possible to reduce power consumption and also, since the coordinate data having poor reliability, obtained immediately before the pen-down means comes away from the surface of the tablet (i.e., right before pen-up), are abolished, the position reading precision is greatly improved.

DESCRIPTION OF THE PREFERRED EMBODIMENTS

Embodiments of the present invention will be described below with reference to the accompanying drawings. In the embodiments described below, the present invention will be described with respect to an example in which a monochromatic STN liquid-crystal display device having a display area with a resolution of 480 dots in the horizontal direction and 320 lines in the vertical direction is used as a display device.

Figure 1:
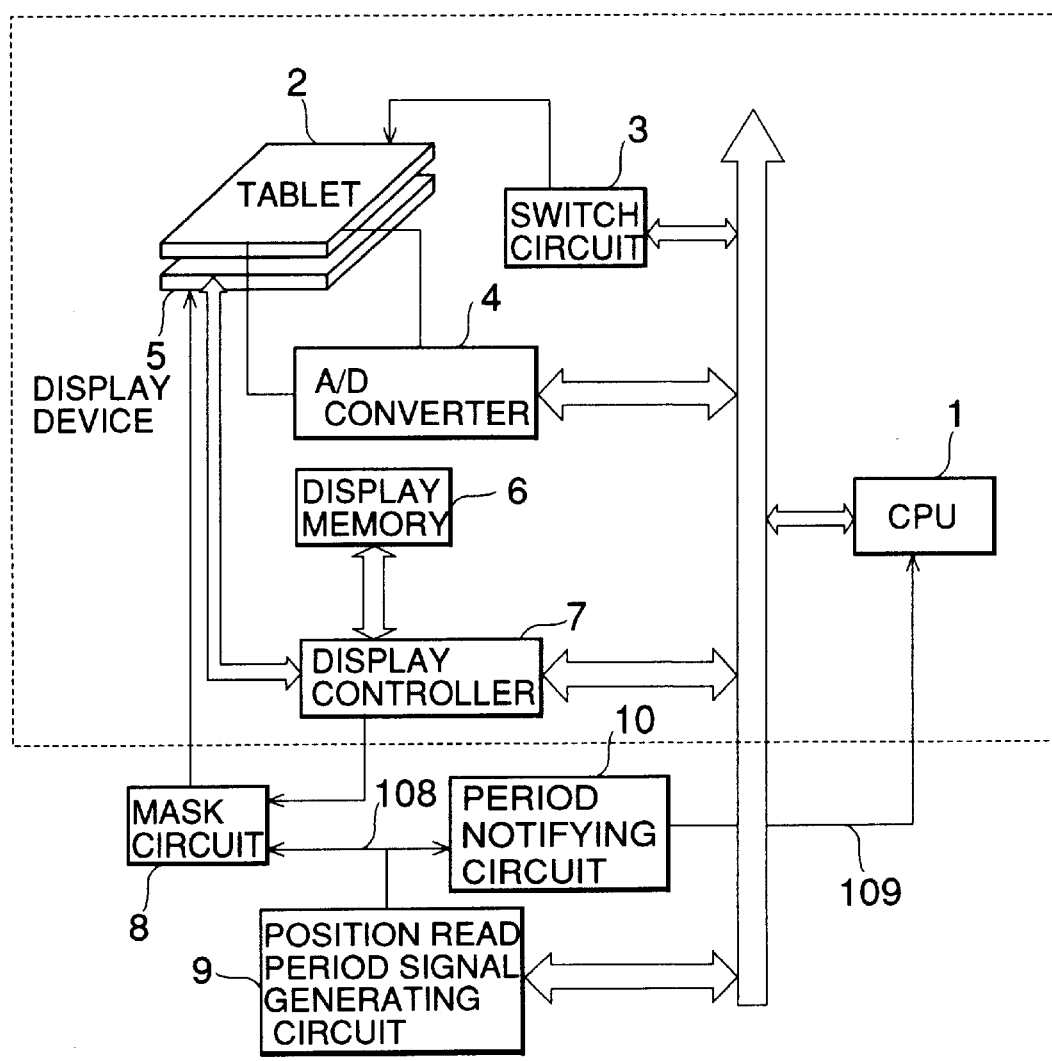
FIG. 1 is a block diagram illustrating a first embodiment of the position reader according to the present invention.

FIG. 1 is a block diagram illustrating a first embodiment of the position reader according to the present invention. In FIG. 1, reference numeral 1 denotes a CPU; 2, a tablet; 3, a switch circuit; 4, an A/D converter; 5, a display device; 6, a display memory; and 7, a display controller. The following components are characteristic of the present invention, where reference numeral 8 denotes a mask circuit; 9, a position read period signal generating circuit; 10, a period notifying circuit; 108, a position read period signal; and 109, a position read notifying signal. The portions surrounded by a dotted line are the same portions as those described in relation to the prior art.

In the device shown in FIG. 1, the CPU 1 controls the whole system, e.g., writes the picture to be displayed on the display device 5 into the display memory 6, reads data obtained by converting analog voltages into digital data to convert them into coordinate data on the tablet 2, and controls the switch circuit 3 used to apply voltages to the horizontal and vertical electrodes of the tablet 2. The display controller 7 reads display data from the display memory 6 to process the data in order to display a picture on the display device 5, and feeds clock pulses, synchronized with the display data, to the display device 5 together with display drive signals.

The coordinate data are read in the same procedure as that described in relation to the prior art. That is, the CPU 1 controls the switch circuit 3 to apply voltages to the horizontal and vertical electrodes of the tablet 2, and activates the A/D converter 4, where the electrical signals corresponding to the pen-down position outputted from the tablet 2 are converted into a digital form by means of the A/D converter 4, and the CPU 1 reads the converted digital data to perform an operation to convert them into coordinate data.

Here, the mask circuit 8, the position read period signal generating circuit 9 and the period notifying circuit 10 characterize this first embodiment. How they operate will be described below with reference to FIG. 2.

Figure 2:
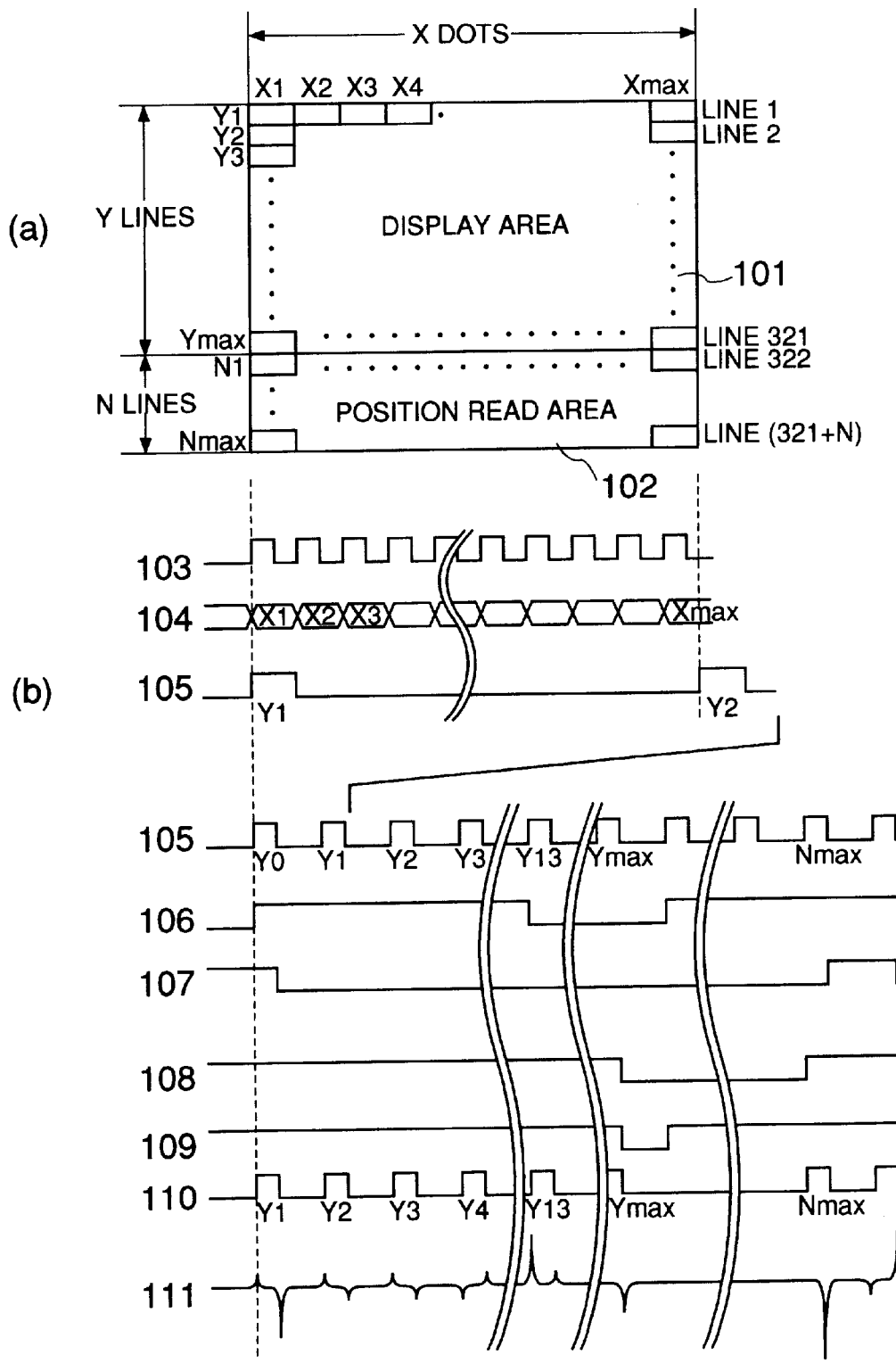
FIG. 2 illustrates how the first embodiment shown in FIG. 1 operates.

FIG. 2, reference symbol (a), shows the relationship between a display area of the liquid-crystal display device 5 and a position read area into which the CPU 1 reads from the tablet 2 the coordinate position corresponding to the pen-down position, the latter area characterizing this first embodiment. Reference numeral 101 denotes the display area; and 102, the position read area.

In FIG. 2, reference symbol (a), the display area 101 is comprised of dots x1, x2, . . . , xmax in the horizontal direction.

Here, the number of the dots is 480 (dots) in total. The display area 101 is also comprised of lines Y1, Y2, . . . , Ymax in the vertical direction. Here, the number of the lines is 321 (lines) in total, which is the number obtained by adding one line to the number of lines the liquid-crystal display device 5 can display. The reason therefor will be explained later.

The position read area 102 is an area formed by adding an area for N lines on the outside of the display area 101 in its horizontal direction, and these lines are denoted by N1, . . . , Nmax. The line N1 which is the first line of this position read area 102 is line 322 subsequent to the last line 321 of the display area 101. Here, the line Y1 to the line Nmax (321+N) constitutes one frame.

FIG. 2, reference symbol (b), illustrates display drive signals corresponding to the display screen shown in FIG. 2, reference symbol (a), and various signals which represent this first embodiment. Reference numeral 103 denotes a display data transfer signal synchronized with the display data; 104, the display data; 105, a horizontal scanning signal; 106, liquid-crystal alternation signal (here, the voltage of liquid-crystal display drive signals is reversed for every 13 lines so as to be alternated); 107, a frame signal; 108, the position read period signal, which characterizes this first embodiment; 109, the position read notifying signal, which also characterizes this first embodiment; 110, an actual horizontal scanning signal at the time of operation in this first embodiment; 111, an actual voltage waveform of the tablet electrodes at the time of operation in this first embodiment.

In FIGS. 1 and 2, the display controller 7 transfers data for 4 dots at one time through the display data transfer signal 103. Hence, for example, the data X1 of the display data 104 contain data of display dots x1, x2, x3 and x4 as shown in FIG. 2, reference symbol (a). Therefore, here, the number of pulses of the display data transfer signal outputted from the display controller 7 is 120 (=480÷4) (pulses) in one line.

Here, in the display controller 7, the number 120 of output pulses per one line of the display data transfer signal 103 and the number (321+N) of horizontal scanning lines are preset by the CPU 1. Also, in the position read period signal generating circuit 9, the value "321" that indicates a start line of the position read period and the value (321+N) that indicates an end line thereof are set.

To perform display on the display device 5, the display controller 7 feeds the display data 104 and the display data transfer signal 103 to the display device 5 periodically and in synchronization with each other, and, after the display data 104 for one line have been transferred, it outputs the horizontal scanning signal 105. Thus, the display device 5 selects the line corresponding to the number of pulses of the horizontal scanning signal 105 fed thereto, and displays the display data 104 for one line transferred to the line thus selected. The display device 5 further serves to count this horizontal scanning signal (pulses) 105, and, at the time it has displayed the data corresponding to 13 lines, it polarity-reverses the liquid-crystal alternation signal 106, where it again starts to count the horizontal scanning signal 105.

The display controller 7 and the display device 5 repeat the foregoing operations to output display drive signals of lines Y1, Y2, . . . up to the line (321+N).

The display controller 7, after it has outputted (321+N) pulses of the horizontal scanning signal 105, further transfers to the display device 5 the display data 104 of the line Y1, the lead line of the display screen, and feeds the frame signal 107 to the display device 5 in synchronization with the Y1 pulse of the horizontal scanning signal 105. Thus, in the display device 5, this frame signal 107 causes the display scanning to return to the lead line Y1, and, even if the horizontal scanning signal 105 for scanning the line Ymax and the subsequent lines are fed, scans the area outside the display area 101 (i.e., the position read area 102) until the frame signal 107 is fed, without affecting the inside of the display area 101.

Inputting such display drive signals and display data, the display device 5 displays a picture of horizontal 480 dots and vertical 320 lines.

Then, the position read period signal generating circuit 9 counts the horizontal scanning signal 105 to compare the count value with the value "321" preset by the CPU 1, and sets the position read period signal 108 to be "L" (low level) when this count value is 321. It further counts the horizontal scanning signal 105, and feeds the "L" position read period signal 108 to the mask circuit 8 and period notifying circuit 10 until it reaches the value (321 +N) preset by the CPU 1.

Then, during the period where this position read period signal 108 remains at "L", the mask circuit 8 masks the display data transfer signal 103 and horizontal scanning signal 105 fed from the display controller 7 and fixes the display data transfer signal 103 and horizontal scanning signal 105 at "L". Therefore, the horizontal scanning signal 105 outputted from the mask circuit 8 to the display device 5 comes to be the signal 110 shown in FIG. 2, reference symbol (b).

The period notifying circuit 10 generates a position read notifying signal 109 with a stated pulse width from falling edges where the position read period signal 108 fed thereto is set to be "L", and feeds the position read notifying signal 109 to the CPU 1. Then, the CPU 1 recognizes from the position read notifying signal 109 that the position read area 102 is to be started. At that point in time, the CPU 1 stops the processing it has performed till that time, and reads the positional data fed from the tablet 2. This position read notifying signal 109 may be, an interrupt signal. As a result, the output signal of the tablet 2 comes to be the signal 111 shown in FIG. 2, reference symbol (b).

The noise caused by the electrostatic coupling between the display device 5 and the tablet 2 occurs at the point of level changes of the horizontal scanning signal 105 and liquid-crystal alternation signal 106 as previously stated in relation to the prior art, and the noise becomes greatest especially at the point of level changes of the liquid-crystal alternation signal 106. In most cases, the liquid-crystal alternation signal 106 is generated in the display device 5 by counting the horizontal scanning signal 105.

As described above, in this first embodiment, the CPU 1 can recognize to start the position read area 102 upon receipt of the position read notifying signal 109 fed thereto, even when it is in the middle of executing other processing. Also, since the mask circuit 8 masks (i.e., fixes) the display data transfer signal 103 and horizontal scanning signal 105 in the scanning period of the position read area 102, there occurs neither the point of level changes of the horizontal scanning signal 105 as a matter of course, nor the point of level changes of the liquid-crystal alternation signal 106. Hence, the noise in the scanning period of the position read area 102 (which, though no scanning is carried out in practice, is expressed in this way for the convenience of description, in contrast to the scanning period of the display area 101) can be totally avoided, and the position can be read with good precision.

While in the display area 101 the number of lines necessary therefor is 320, the number Y of the lines is 321 to provide the line 321 as described previously. The reason why this is will be described here.

If the number of lines of the display area 101 is set to be 320, the display device 5 continues to select 320 lines to carry out its display, when the scanning of the display area 101 is completed and the mask circuit 8 keeps masking the horizontal scanning signal 105 at the line 321. As a result, the line 320 is continued to be displayed for a longer time than other lines, so that, in the case when the display device 5 is a liquid-crystal display device, the line 320 has a higher brightness than other lines.

If, however, as in this first embodiment the number of lines of the display area 101 is set to be 321 so that the last line 321 stands outside the display screen of the display device 5, this line never appears in the display screen even when this line 321 is selected and displayed for a long time. Thus, once the scanning of the display area 101 has been completed, all the 320 lines of the display area 101 on the display screen come to stand unselected (an undisplayed state), so that all of these lines have a uniform brightness.

Figure 3:
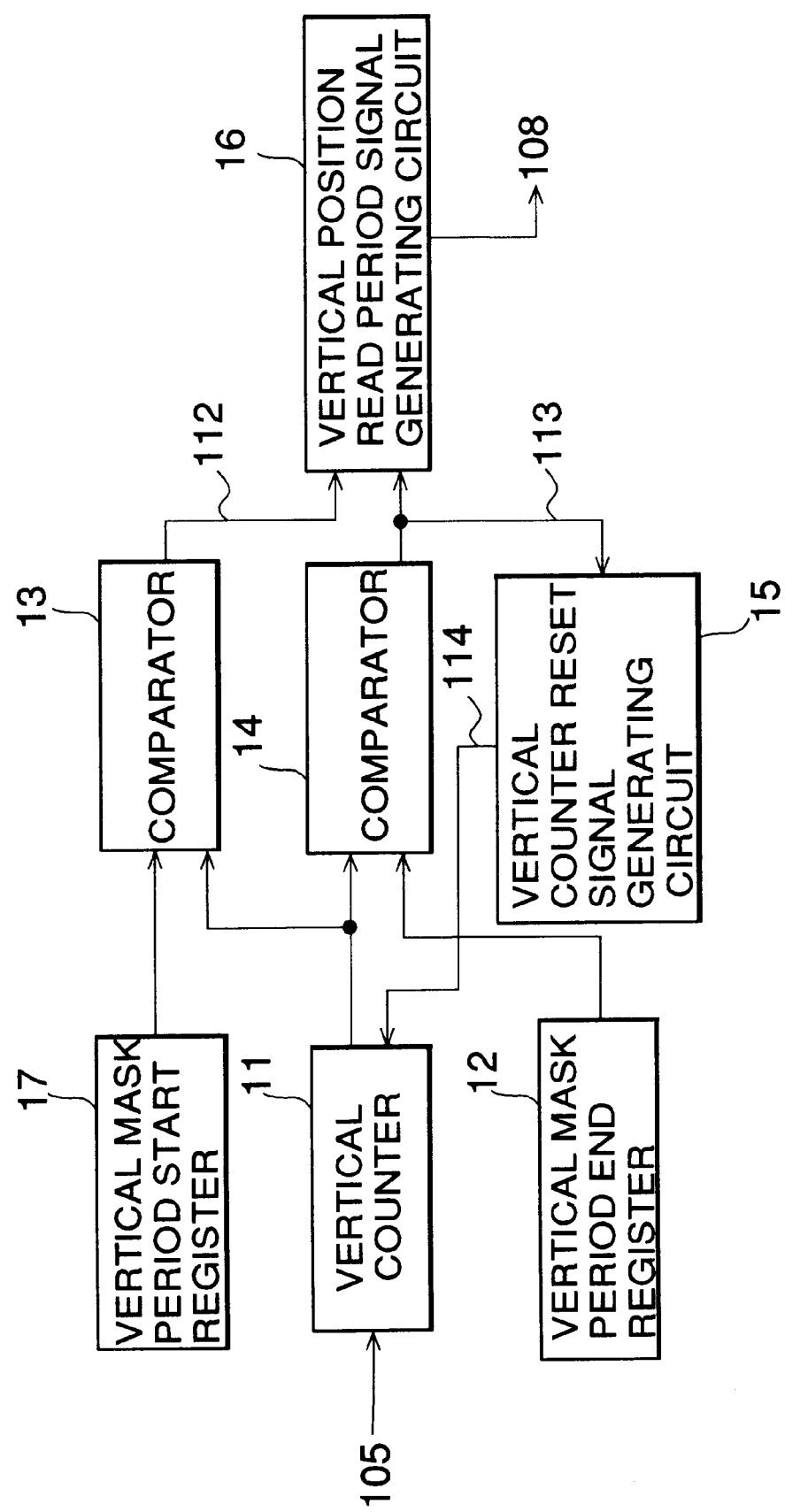
FIG. 3 is a block diagram illustrating an example of the position read period signal generating circuit shown in FIG. 1.

FIG. 3 is a block diagram illustrating an example of the position read period signal generating circuit 9 shown in FIG. 1. Reference numeral 17 denotes a vertical mask period start register; 11, a vertical counter; 12, a vertical mask period end register; 13 and 14, comparators; 15, a vertical counter reset signal generating circuit; 16, a vertical position read period signal generating circuit; 112 and 113, comparison output signals; and 114, a vertical counter reset signal.

In the circuit shown in FIG. 3, as described with reference to FIG. 2, the value "321" that indicates the start line of the position read area 102 is previously written in the vertical mask period start register 17, and the value (321+N) that indicates the last line is also previously written in the vertical mask period end register 12. This value N corresponds to the number of lines (the time width in the case of the position read period signal) of the position read area 102 shown in FIG. 2, reference symbol (a). The number of lines of the position read area 102 may be arbitrarily set so long as flickers and a decrease in brightness in the screen of the liquid-crystal display device 5 (FIG. 1) are taken into account. Usually, it may be set within the range where the frame frequency is up to about 70 Hz.

The vertical counter 11 counts the horizontal scanning signal 105 fed from the display controller 7. The count value obtained is compared with the preset value "321" of the vertical mask period start register 17 in the comparator 13. When they are both equal to each other, the comparator 13 generates its comparison output signal 112 and feeds it to the vertical position read period signal generating circuit 16. As a result, the position read period signal 108 is set to be "L".

The count value of the vertical counter 11 is also compared with the value (321+N) preset in the vertical mask period end register 12 by the comparator 14. When they are both equal to each other, the comparator 14 generates its comparison output signal 113 and feeds it to the vertical position read period signal generating circuit 16 and to the vertical counter reset signal generating circuit 15.

Then, the vertical position read period signal generating circuit 16 is so designed as to set the position read period signal 108 to be "H" (high level) at the timing of the comparison output signal 113 and indicate that the scanning period of the position read area 102 has ended. Also, the vertical counter reset signal generating circuit 15 outputs the vertical counter reset signal 114 at the timing of the comparison output signal 113, to thereby zero-clear the vertical counter 11. Thus, the scanning for one frame is completed, and then the scanning is moved to the next frame to repeat similar operations.

The period for which the position read period signal 108 obtained in this way remains "L" corresponds to the scanning period of the position read area 102 shown in FIG. 2, reference symbol (a).

Accordingly, assume that, for example, in the operations shown in FIG. 2, the horizontal scanning signal 105 has a frequency of 30 KHz, the time necessary for displaying a liquid-crystal display screen which is the display area 101 having 320 lines is:

$$320 \times 1/(30 \times 10^3) = 10.7 \ msec.,$$

and, assume that the frame frequency is 70 Hz, one-frame period is 1/70 sec., i.e., 14.3 msec. Therefore, the scanning period of the position read area 102 can be arbitrarily set within the range of:

$$14.3 - 10.7 = 3.6 \ msec.$$

In this way, a sufficiently long period for which the levels of the display drive signals are stable can be assured as the scanning period, and hence positional information can be read numbers of times in the same period, bringing about an improvement in precision of the positional information.

The above respective circuits can be readily set up using general-purpose TTL and LSI.

Figure 4:
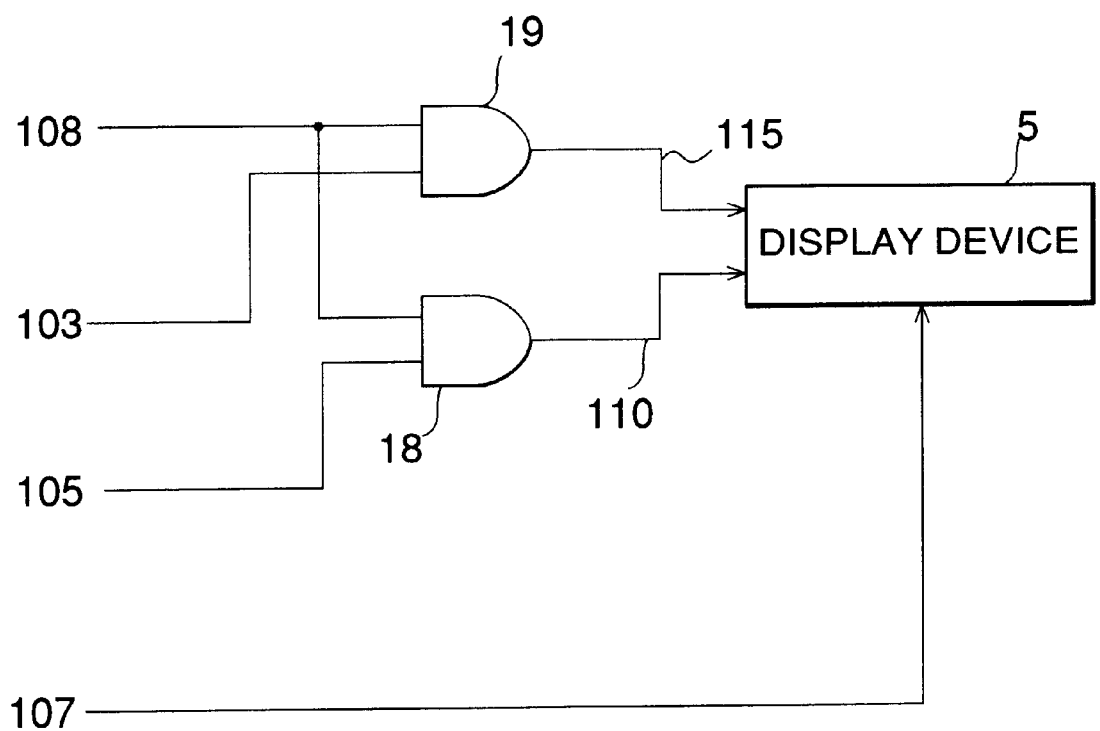
FIG. 4 is a block diagram illustrating an example of the mask circuit shown in FIG. 1.

FIG. 4 is a block diagram illustrating an example of the mask circuit 8 shown in FIG. 1. Reference numerals 19 and 18 denote AND devices. Components and signals corresponding to those shown in FIGS. 2 and 1 are denoted by like reference numerals. In the circuit shown in FIG. 4, the AND device 19 masks the display data transfer signal 103 during the period where the position read period signal 108 remains "L" (i.e., fixes the signal to "L"), and feeds it to the display device 5 as a display data transfer signal 115. The AND device 18 also masks the horizontal scanning signal 105 during the period where the position read period signal 108 remains "L" (i.e., fixes the signal to "L"), and feeds it to the display device 5 as the horizontal scanning signal 110.

In this way, the display data transfer signal 115 and the horizontal scanning signal 110 are simultaneously fixed to "L" during the period where the position read period signal 108 remains "L". In the display device 5, the position read area 102 is set as a result of the feeding of these "L"-state display drive signals to the display device 5. The frame signal 107 from the display controller 7 is fed to the display device 5 without passing through the mask circuit 8.

Figure 5:
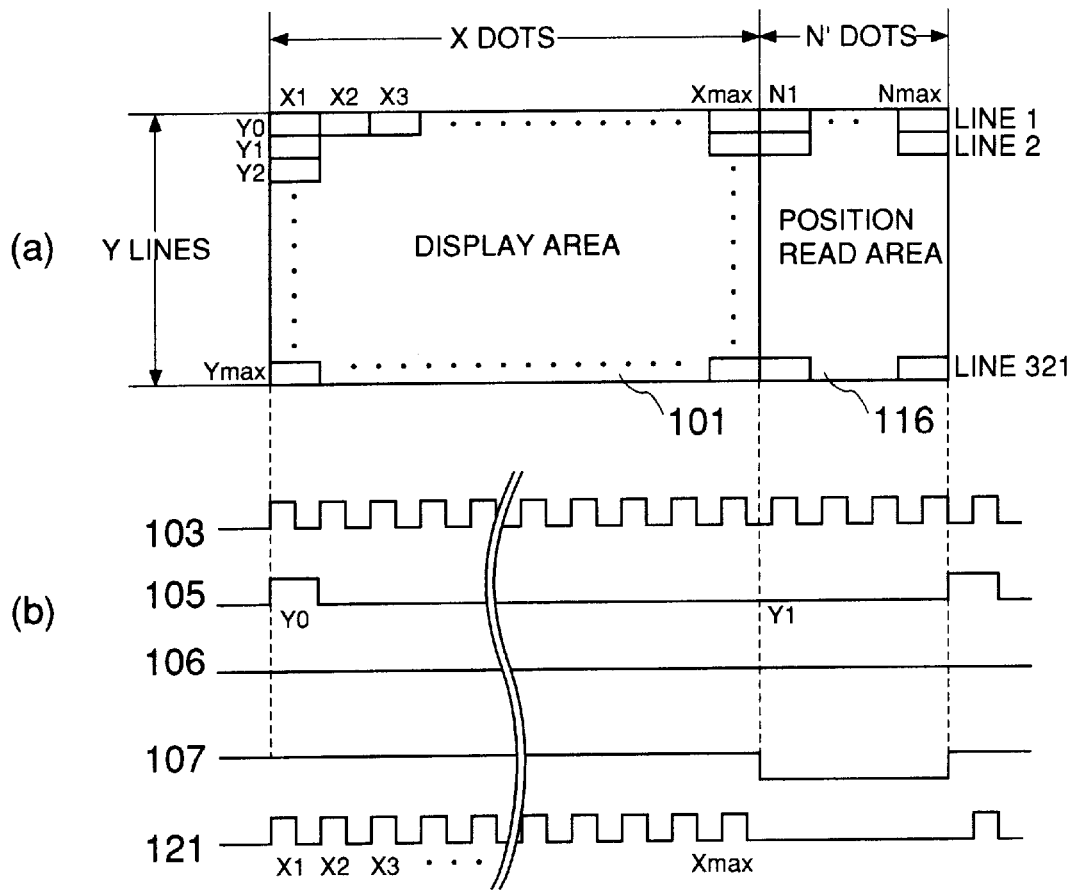
FIG. 5 illustrates how a second embodiment of the position reader according to the present invention operates.

FIG. 5 illustrates how a second embodiment of the position reader according to the present invention operates. Reference numeral 116 denotes a position read area; and 117, a position read period signal. Components and signals corresponding to those shown in FIG. 1 are denoted by like reference numerals to avoid repeating the description. In the first embodiment previously described, the position read area 102 is provided in succession to the display area 101 in its vertical direction with respect to the screen of the display device 5. In this second embodiment, the position read area is provided in the horizontal scanning direction of the display area 101. As the whole set-up of the system, this second embodiment is constituted in the same manner as the first embodiment shown in FIG. 1.

FIG. 5, reference symbol (a), diagrammatically illustrates the period of one frame in relation to the display area of the display device 5, where the position read area 116 is provided in the horizontal direction of the display area 101 and the time taken for scanning the display area 101 and position read area 116 is set as one frame. As shown in FIG. 5, reference symbol (a), since the position read area 116 is provided, no level changes in the horizontal scanning signal 105 and liquid-crystal alternation signal 106 may occur within this area 116. Hence, the noise caused by the horizontal scanning signal 105 and liquid-crystal alternation signal 106 can be prevented. Since the noise occurring from the substrate is also reduced, the display data transfer signal 103 may be fed as a fixed output in the position read area 116. How the device operates to accomplish the intended results will be described below.

In this second embodiment, as shown in FIG. 5, reference symbol (a), a position read area 116 having dots N1 to Nmax is provided in the horizontal direction of the display area 101, and, as shown in FIG. 5, reference symbol (b), the position read period signal 117 is set so as to be "L" in the scanning period of this position read area 116. Then, the display data transfer signal 103 is masked in the "L" period of the position read period signal 117, and serves as a display data transfer signal 121 shown in FIG. 5, reference symbol (b). With regard to this display data transfer signal 121, the display data transfer signal 103 is fed during the period included in the display area 101 for each line (FIG. 5, reference symbol (a)) and the display data transfer signal 103 is not fed during the period included in the position read area 116 (FIG. 5, reference symbol (a)). Thus, during the period of the position read area 116, the display data transfer signal 103 and the liquid-crystal alternation signal 106 are fixed, and no noise occurs in the tablet 2. Hence, the device can be effective like that of the first embodiment. Also, providing the position read area 116 in the horizontal direction of the display area 101 is more advantageous than the first embodiment in view of flickers and contrast ratios in the screen of the liquid-crystal display device.

Figure 6:
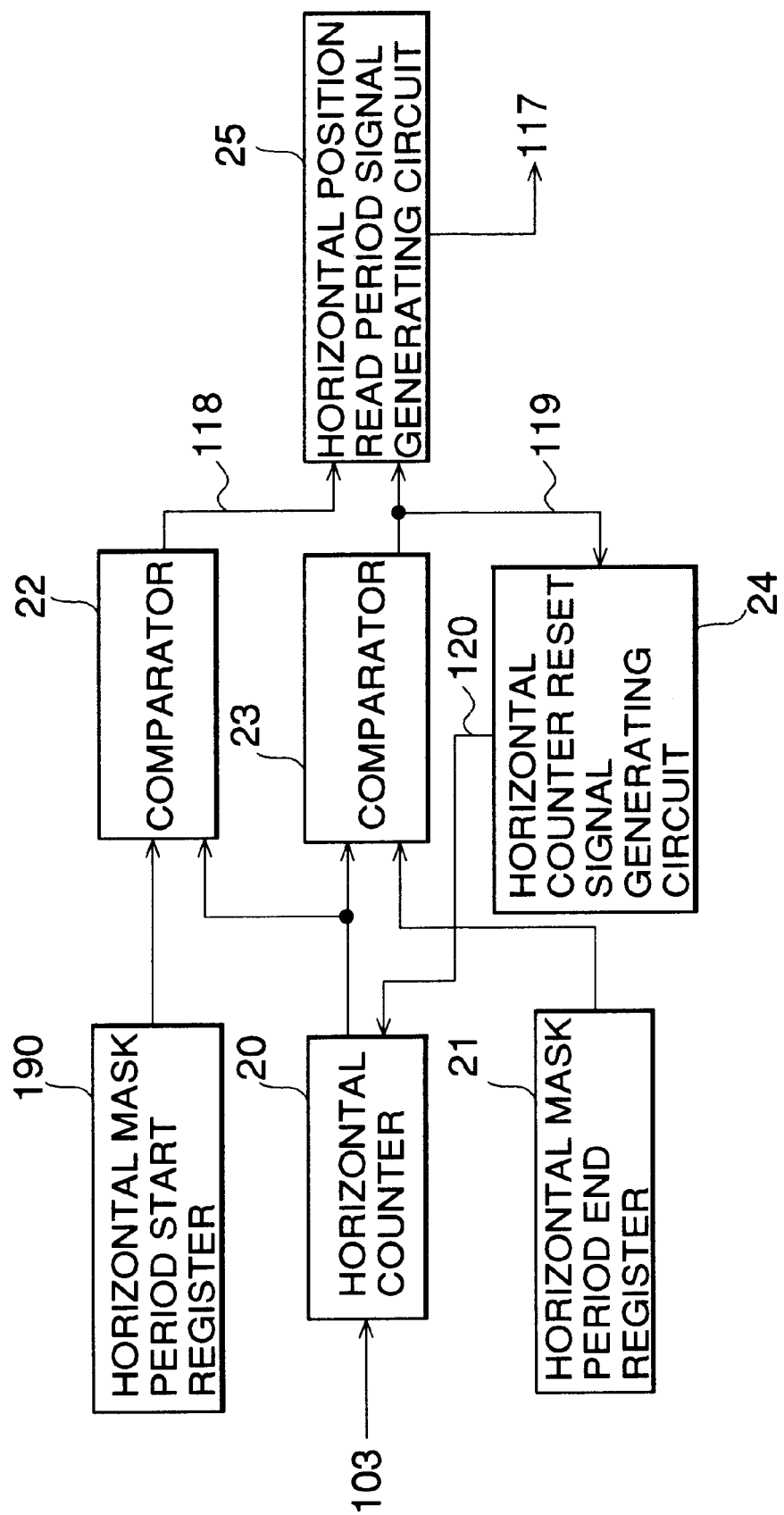
FIG. 6 is a block diagram illustrating an example of the position read period signal generating circuit in the second embodiment of the position reader according to the present invention.

FIG. 6 is a block diagram illustrating an example of the position read period signal generating circuit 9 (FIG. 1) in the second embodiment of the position reader according to the present invention. Reference numeral 190 denotes a horizontal mask period start register; 20, a horizontal counter; 21, a horizontal mask period end register; 22 and 23, comparators; 24, a horizontal counter reset signal generating circuit; 25, a horizontal position read period signal generating circuit; 118 and 119, comparison output signals; and 120, a horizontal counter reset signal. In the device and circuit shown in FIGS. 5 and 6, the horizontal counter 20 counts the display data transfer signal 103 fed from the display controller 7 (FIG. 1). On the basis of the resolution of the display device 5 (FIG. 1), a value "120" equal to the number of pulses for one line in the display area 101, of the display data transfer signal 103 is preset in the horizontal mask period start register 190, and a value (120+N) that indicates the last pulse of the display data transfer signal 103 fed to the position read area 116 is preset in the horizontal direction mask period end register 21.

Except for the foregoing, the circuit is the same as the position read period signal generating circuit 9 shown in FIG. 3, and the position read period signal 117 is outputted for each line from the vertical position read period signal generating circuit 25. This position read period signal 117 is set to be "L" in the scanning period of the position read area 116 shown in FIG. 5.

Figure 7:
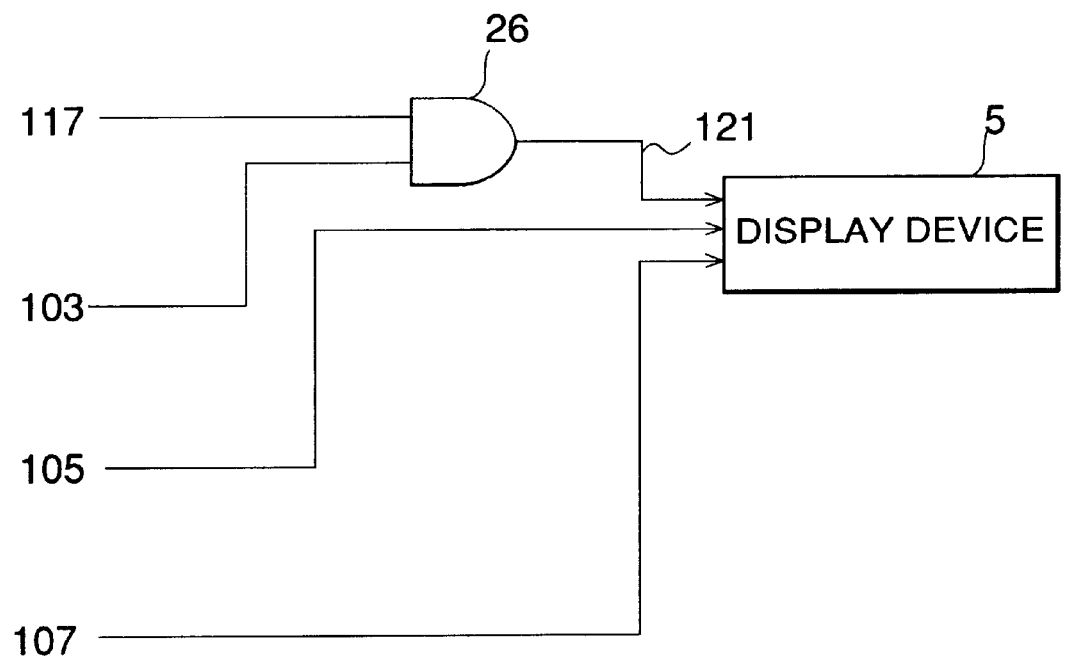
FIG. 7 is a block diagram illustrating an example of the mask circuit in the second embodiment of the position reader according to the present invention.

FIG. 7 is a block diagram illustrating an example of the mask circuit 8 (FIG. 1) that controls the position read area 116 in this second embodiment. Reference numeral 26 denotes an AND device. Components and signals corresponding to those shown in previous drawings are denoted by like reference numerals.

In the device and circuit shown in FIGS. 5 and 7, the AND device 26 masks the display data transfer signal 103 during the period where the position read period signal 117 from the position read period signal generating circuit 9 shown in FIG. 6 remains "L" (i.e., fixes the signal to "L"), and feeds it to the display device 5 as the display data transfer signal 121. More specifically, the period of the position read area 116 is set as a result of the feeding of the "L"-state display drive signal to the display device 5. The frame signal 107 and horizontal scanning signal 105 from the display controller 7 (FIG. 1) are fed to the display device 5 without passing through the mask circuit 8.

Figure 8:
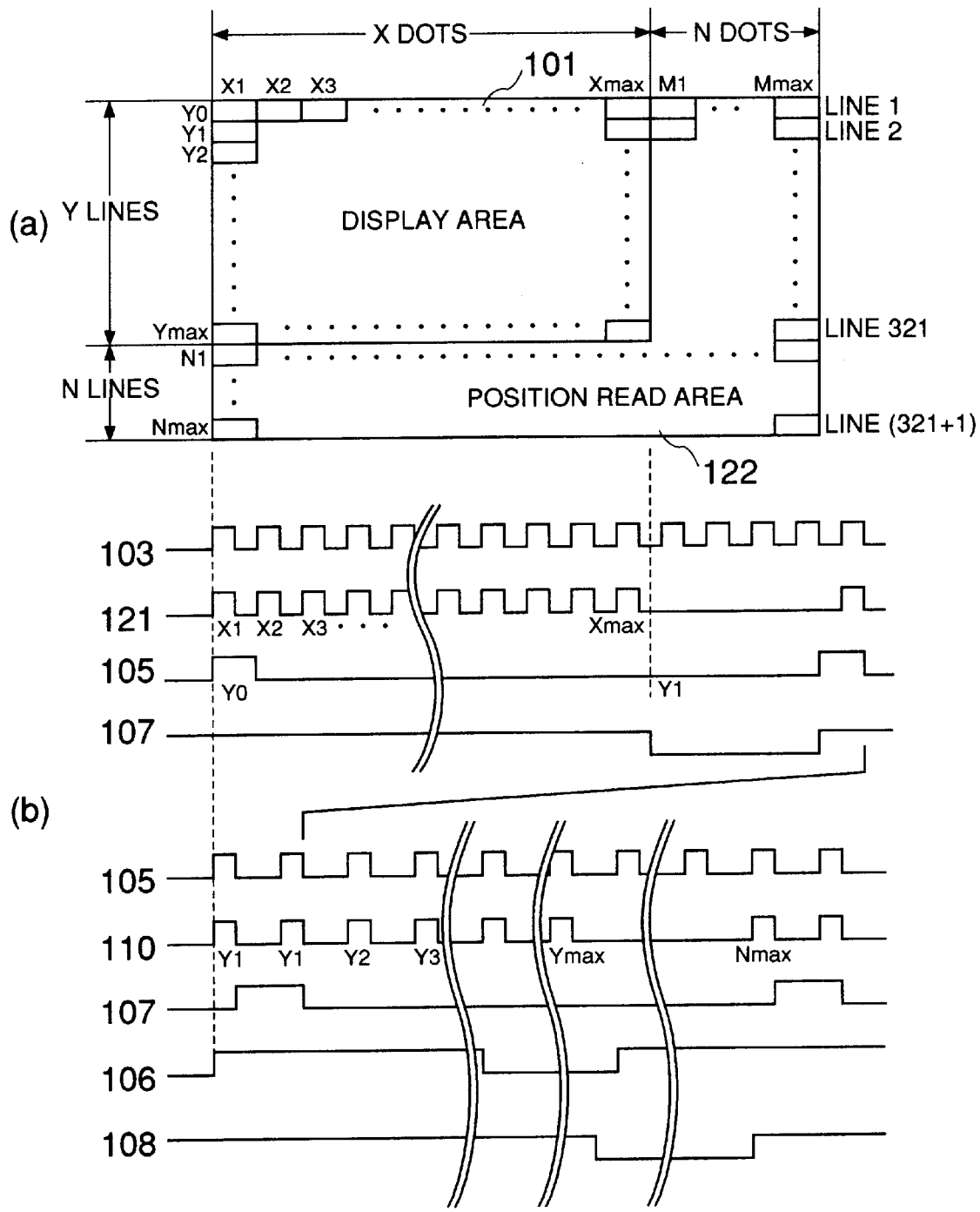
FIG. 8 illustrates how a third embodiment of the position reader according to the present invention operates.

FIG. 8 illustrates how a third embodiment of the position reader according to the present invention operates. Reference numeral 122 denotes a position read area; 117, a horizontal-direction position read period signal; 108, vertical-direction position read period signal. Components and signals corresponding to those shown in the previous drawings are denoted by like reference numerals. In this third embodiment, the position read area 122 is so provided as to extend in the horizontal and vertical directions of the display area.

FIG. 8, reference symbol (a), diagrammatically illustrates the period of one frame in relation to the display area of the display device 5, where the position read area 122 is provided in the horizontal and vertical directions of the display area 101 and the time taken for scanning the display area 101 and position read area 122 is set as one frame. As the set-up of the system, this third embodiment is also constituted in the same manner as the first embodiment shown in FIG. 1. In this third embodiment, the position read period signal generating circuit 9 has the vertical position read period signal generating circuit 16 shown in FIG. 3, which reads the position in the direction of vertical scanning, and the horizontal position read period signal generating circuit 25 shown in FIG. 6, which reads the position in the direction of horizontal scanning. Thus, two kinds of position read period signals are generated, one of which is the horizontal-direction position read period signal 117, which is set to be "L" during the period assigned to the position read area 122 extending in the direction of horizontal scanning where M1 to Mmax dots are imagined in the position read area 122 in the direction of horizontal scanning along the lines Y0, Y1, . . . , Ymax, as shown in FIG. 8, reference symbol (b), and the other of which is the vertical-direction position read period signal 108, which is set to be "L" during the period assigned to the position read area 122 extending in the direction of vertical scanning, as shown in FIG. 8, reference symbol (b). These horizontal-direction position read period signal 117 and vertical-direction position read period signal 108 are fed to the mask circuit 8 shown in FIG. 1, provided in this third embodiment.

Figure 9:
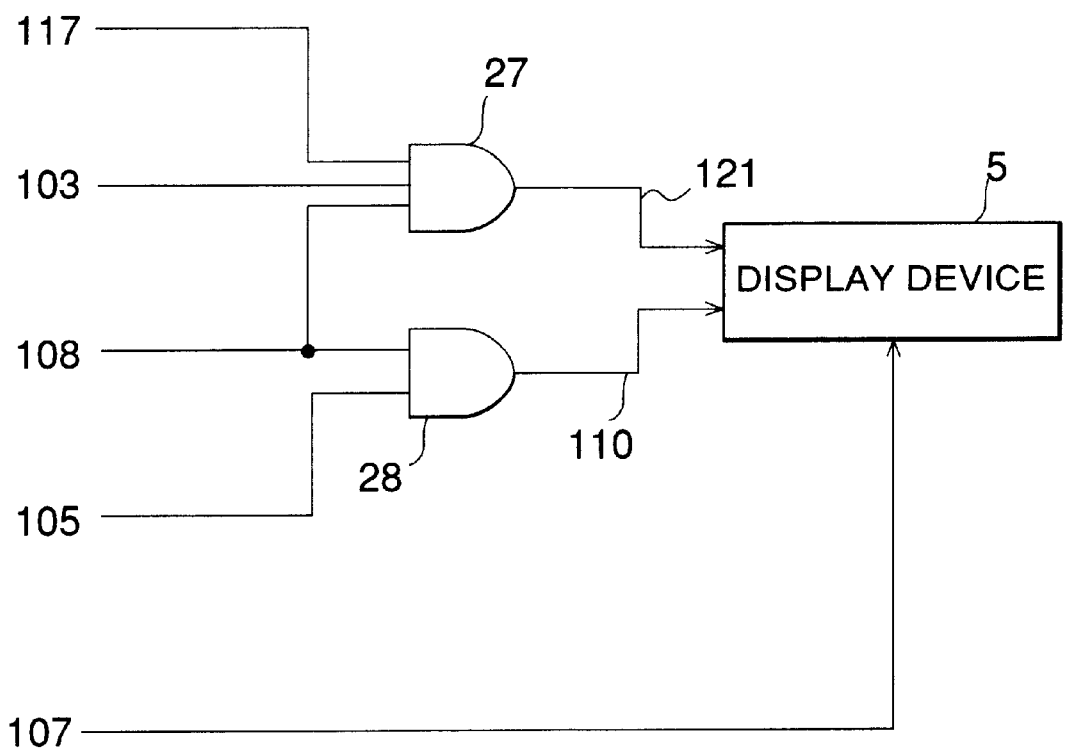
FIG. 9 is a block diagram illustrating an example of the mask circuit in the third embodiment of the position reader according to the present invention.

FIG. 9 is a block diagram illustrating an example of the mask circuit 8 (FIG. 1) in this third embodiment. Reference numerals 27 and 28 denote AND devices. Components and signals corresponding to those shown in the previous drawings are denoted by like reference numerals. In the device and circuit shown in FIGS. 8 and 9, the AND device 27 masks the display data transfer signal 103 during the period where the horizontal-direction position read period signal 117 and vertical-direction position read period signal 108 are "L" (i.e., fixes the signals to "L"), and feeds them to the display device 5 as a display data transfer signal 121. The AND device 28 also masks the horizontal scanning signal 105 during the period where the vertical-direction position read period signal 108 is "L" (i.e., fixes the signal to "L"), and feeds it to the display device 5 as the horizontal scanning signal 110. The position read area 122 shown in FIG. 8 is set by these "L"-state display data transfer signal 121 and horizontal scanning signal 110. The display data transfer signal 103 and the horizontal scanning signal 105 are designed so as to be fixed to "L" when masked, but, may also be designed so as to be fixed to "H", bringing about similar effects.

As described above, according to the present invention, the position read area where position reading is performed is provided outside the display area, and the display drive signals that cause noise in the tablet are outputted at a fixed level during the period for the position reading. Hence, the noise that affects the tablet can be totally prevented to enable good position reading. Moreover, since the start of the position read area is notified to the CPU, the CPU can perform other processing until the position read area is notified, bringing about a significant improvement in processing efficiency of the CPU.

Figure 10:
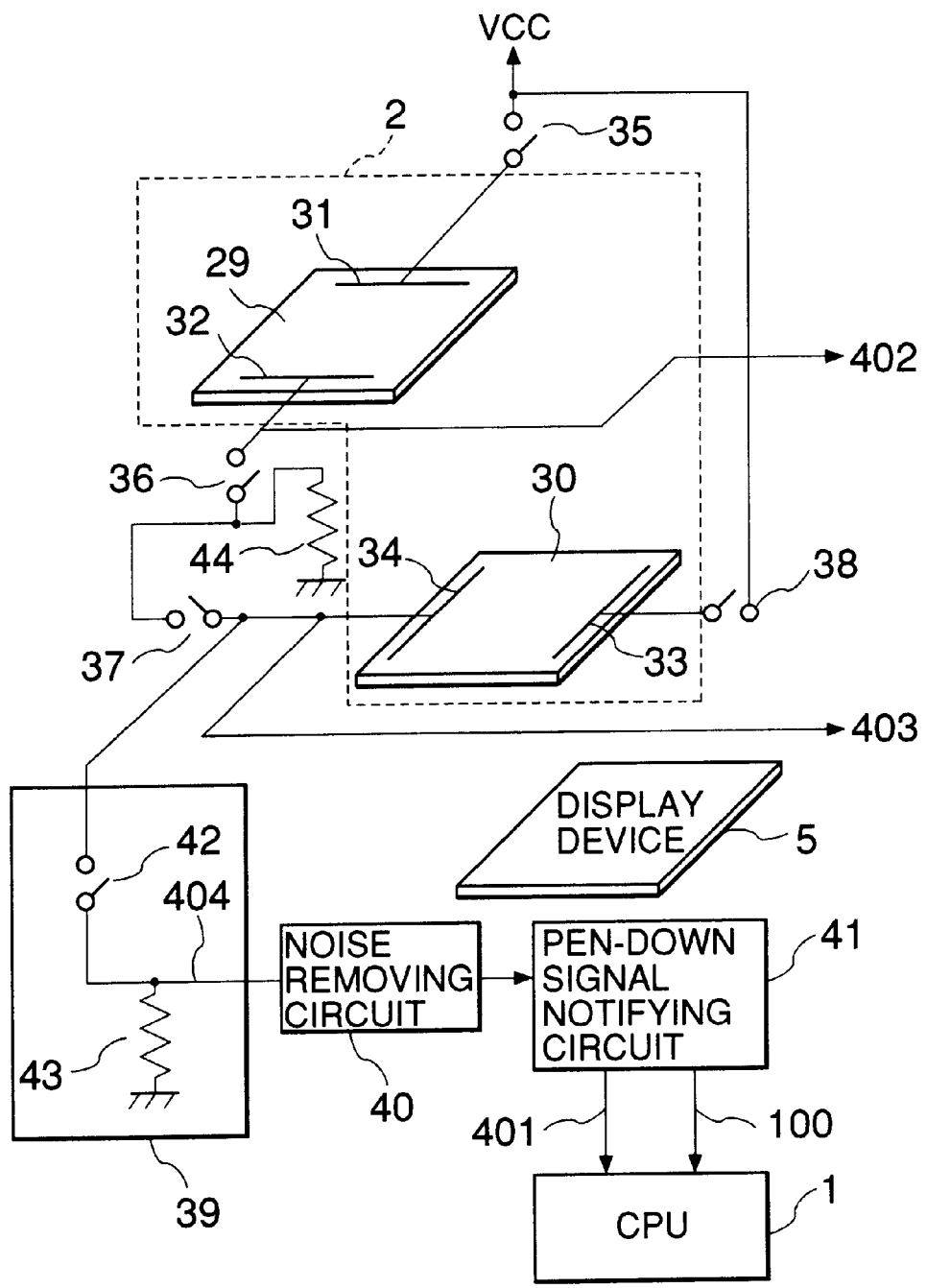
FIG. 10 illustrates the constitution of a fourth embodiment of the position reader according to the present invention.

FIG. 10 illustrates the constitution of a fourth embodiment of the position reader according to the present invention. In FIG. 10, reference numeral 29 denotes a vertical-direction transparent resistance film; 30, a horizontal-direction transparent resistance film; 31, an anode-side horizontal electrode; 32, a cathode-side horizontal electrode; 33, an anode-side vertical electrode; 34, a cathode-side vertical electrode; 35 to 38, switches; 39, a pen-down signal detecting circuit; 40, a noise removing circuit; 41, a pen-down signal notifying circuit; 42, a switch; 43 and 44, resistances; 100, a tablet pen-down detecting signal; 401, a pen condition signal; 402, horizontal-direction read terminal; 403, vertical-direction read terminal; and 404, a pen-down signal. Components corresponding to those shown in FIG. 1 are denoted by like reference numerals.

In the device shown in FIG. 10, the tablet 2 is constituted of the vertical-direction transparent resistance film 29 and the horizontal-direction transparent resistance film 30 which serve as an X-side resistance sheet and a Y-side resistance sheet, respectively, and are put together to leave a given minute gap between them. These transparent resistance films 29 and 30 have a structure wherein they are placed on top of each other to leave a uniform minute gap between them. The pen-down signal detecting circuit 39 is comprised of the switch 42 and the resistance 43. Here, such a tablet 2 is integrated with the display device 5 to leave a certain gap between them. However, the tablet 2 need not necessarily be provided in the manner where it is superimposed on the display device 5.

The anode-side horizontal electrode 33 of the horizontal-direction transparent resistance film 30 and the anode-side vertical electrode 31 of the vertical-direction transparent resistance film 29 are so provided that a positive power source voltage VCC is applied to them through the switches 38 and 35, respectively. The cathode-side horizontal electrode 34 of the horizontal-direction transparent resistance film 30 and the cathode-side vertical electrode 32 of the vertical-direction transparent resistance film 29 are so provided that the voltage is applied to them through the switches 37 and 36, respectively, and are further grounded through a common resistance 44. Then, the horizontal-direction read terminal 402 is connected to a portion connecting the vertical electrode 32 of the vertical-direction transparent resistance film 29 and the switch 36, and the vertical-direction read terminal 403 is connected to a portion connecting the horizontal electrode 34 of the horizontal-direction transparent resistance film 30 and the switch 37.

This fourth embodiment is characterized in that, when the tablet is not in the state of pen-down, only the switches 35 and 42 are in the on-state and the device is brought into a state where only the pen-down is read, and that the pen-down signal detecting circuit 39, the noise removing circuit 40 and the pen-down signal notifying circuit 41 are provided so that this pen-down is detected.

More specifically, this fourth embodiment is made up as follows: Stated correspondingly to FIG. 1, the tablet 2 corresponds to the tablet 2 shown in FIG. 1, and the switches 35 to 38, to the switch circuit 3 shown in FIG. 1. In this fourth embodiment, as additional features, the pen-down signal detecting circuit 39, the noise removing circuit 40 and the pen-down signal notifying circuit 41 are provided in such a manner that they are connected to a portion connecting the horizontal electrode 34 of the horizontal-direction transparent resistance film 30 and the switch 37. In the state where only the switches 35 and 42 are in the on-state when the tablet is not in the state of pen-down, an electrical path passing through the switch 35, the pen-down point of the vertical-direction transparent resistance film 29, the horizontal-direction transparent resistance film 30, the switch 42 and the resistance 43 from the power source is formed at the time of pen-down, so that a voltage 404 is produced in the resistance 43. This is detected by the pen-down signal detecting circuit 39, and processed in the noise removing circuit 40 and pen-down signal notifying circuit 41 so that the CPU 1 can reliably detect the pen-down on the tablet 2 without being affected by impulse noises caused in the tablet 2 at the point of a level change in the liquid-crystal alternation signal 106, because of its electro-static coupling with the display device 5.

Thus, in this fourth embodiment, the electric current caused to flow the tablet 2 can be made small before the CPU 1 detects the pen-down, to thereby achieve a reduction of power consumption.

How the device of this fourth embodiment operates to read the coordinate of a pen-down point on the tablet 2 will be described below in detail. The processing of the signals read from the tablet 2 is operated in the same manner as in the embodiments previously described.

Once the tablet 2 is pushed down with a pen (not shown), the vertical-direction transparent resistance film 29 and the horizontal-direction transparent resistance film 30 come in contact with each other at the pen-down point. In order to read the horizontal-direction coordinate position of pen-down, the CPU 1 first brings the switches 37 and 38 into a closed state (hereinafter "on-state"). As a result, a positive power source voltage VCC is applied to the anode-side horizontal electrode 33 of the horizontal-direction transparent resistance film 30, and the cathode-side horizontal electrode 34 is connected to a ground terminal, so that an electric current is caused to flow to the horizontal-direction transparent resistance film 30 from the horizontal electrode 33 side toward the horizontal electrode 34 side. Now, in the state of pen-down, since the vertical-direction transparent resistance film 29 comes in contact with the horizontal-direction transparent resistance film 30 at the pen-down point, a tapped or divided voltage of the horizontal-direction transparent resistance film 30 at this contact point is outputted to the horizontal-direction read terminal 402. This tapped voltage is processed in the A/D converter 4 shown in FIG. 1, and converted into digital data, and the data are fed to the CPU 1. The CPU 1 performs an operation to process the digital data to produce a horizontal-direction coordinate point of pen-down.

Next, in order to read the vertical-direction coordinate position of pen-down, the CPU 1 brings the switches 37 and 38 into an open state (hereinafter "off-state") and also the switches 35 and 36 into the on-state. Thus, the positive power source voltage VCC is applied to the anode-side vertical electrode 31 of the vertical-direction transparent resistance film 29, and the cathode-side vertical electrode 32 is connected to a ground terminal, so that an electric current is caused to flow to the vertical-direction transparent resistance film 29 from the vertical electrode 31 side toward the vertical electrode 32 side. Now, a tapped voltage at the point where the vertical-direction transparent resistance film 29 comes in contact with the horizontal-direction transparent resistance film 30 is produced in the vertical-direction read terminal 403, and this voltage is processed in the A/D converter 4 shown in FIG. 1, and converted into digital data, and the data are fed to the CPU 1. The CPU 1 performs an operation to process the digital data to produce a vertical-direction coordinate point of pen-down.

How the pen-down signal detecting circuit 39, noise removing circuit 40 and pen-down signal notifying circuit 41 operate which characterize this fourth embodiment will be described below in detail.

When the tablet is not in the state of pen-down, the CPU 1 brings the switches 35 and 42 into the on-state. Since a minute gap is provided between the vertical-direction transparent resistance film 29 and the horizontal-direction transparent resistance film 30, the vertical-direction transparent resistance film 29 and the horizontal-direction transparent resistance film are kept insulated from each other when not in the state of pen-down, and no electric current flows across them. Hence, no electric current flows to the resistance 43. Since the resistance 43 is connected to the ground terminal, the pen-down signal 404 generated in this resistance 43 remains "L", and this continues to be fed to the pen-down signal notifying circuit 41 through the noise removing circuit 40. Then, the pen-down signal notifying circuit 41 feeds this pen-down signal 404 to the CPU 1 as the pen condition signal 401 and at the same time causes no change in the tablet pen-down detecting signal 100, so as not to notify the CPU 1 of the pen-down. Hence, in that situation, the CPU 1 can perform other processing without controlling the tablet 2. When thereafter brought into a pen-down state, the vertical-direction transparent resistance film 29 and the horizontal-direction transparent resistance film 30 are connected at the pen-down point. Since the switch 42 is in the on-state, an electric current flows, for the first time, from the vertical-direction transparent resistance film 29 to the horizontal-direction transparent resistance film 30, the switch 42 and the resistance 43 through this point of connection. Thus, the pen-down signal 404 generated in the resistance 43 is set to be "H", and is fed to the noise removing circuit 40. The noise removing circuit 40 removes noise from the pen-down signal 404, and feeds the signal to the pen-down signal notifying circuit 41. Thus, the pen-down signal notifying circuit 41 feeds the "H"-state pen-down signal 401 to the CPU 1 and at the same time causes a change in the tablet pen-down detecting signal 100, to thereby notify the CPU 1 that the pen-down has occurred. The CPU 1, upon receipt of the notification, starts the processing for position reading.

Figure 11:
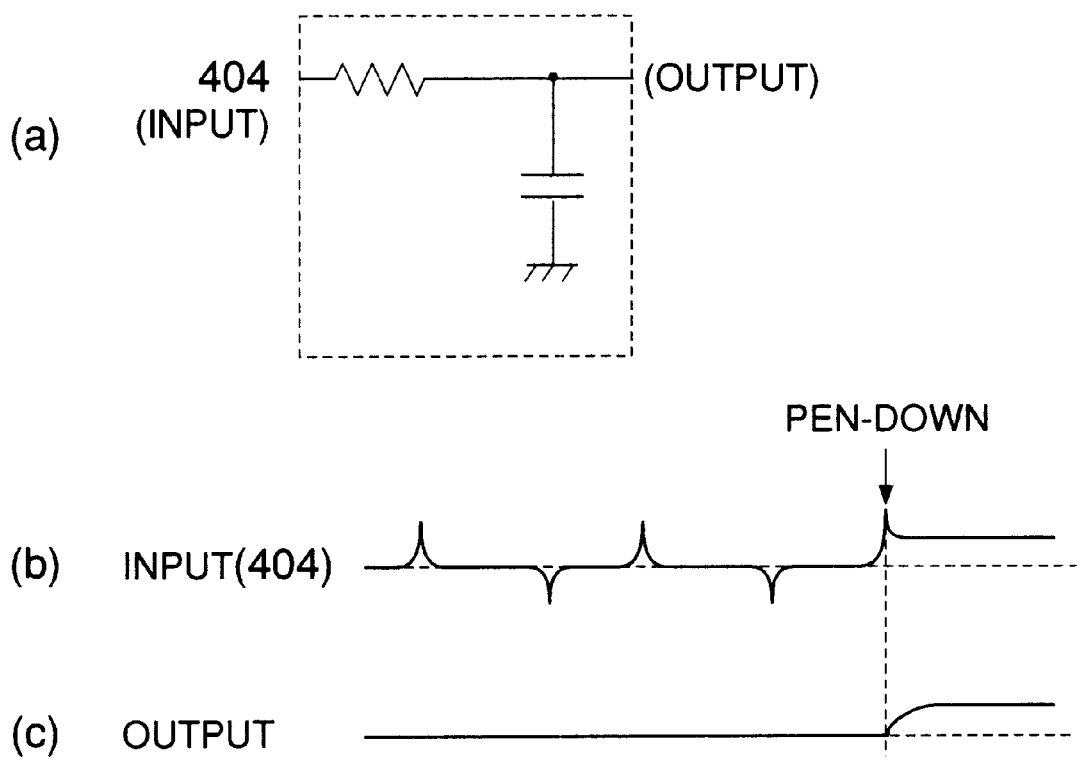
FIG. 11 illustrates an example of the noise removing circuit shown in FIG. 10.

The noise removing circuit 40, as shown in FIG. 11, reference symbol (a), may be made up using a simple, low-pass filter circuit. Using this circuit, impulse noise caused at the point of a level change in the liquid-crystal alternation signal 106, which noise occurs in the tablet 2 because of its electrostatic coupling with the display device 5 and is superimposed on the pen-down signal 404 as shown in FIG. 11, reference symbol (b), are interrupted by the noise removing circuit 40, so that only the pen-down signal 404 passes through the noise removing circuit 40. Hence, as shown in FIG. 11, reference symbol (c), the pen-down signal 404 having passed the noise removing circuit 40 becomes a signal whose level has been changed from that at the time of pen-down. This pen-down signal 404 is wave-shaped in the pen-down signal notifying circuit 41, and then fed to the CPU 1 as the pen-down signal 401. Thus, the CPU 1 can avoid the wrong pen-down signal 404 being generated in the liquid-crystal alternation signal 106 and can reliably recognize the pen-down. In this fourth embodiment, the CPU 1 can also immediately recognize the occurrence of pen-down by using the tablet pen-down detecting signal 100 as an interrupt signal.

An example of how the device of the fourth embodiment operates when the pen-down actually occurs will be described below with reference to FIG. 12. This device is designed to operate so that the throughput of the CPU can be effectively utilized and also the power consumption can be significantly reduced. As signals serving as conditions for changing or switching the processing, the tablet pen-down detecting signal 100 and the position period notifying signal 109 as shown in FIGS. 1 and 10 are used.

Figure 12:
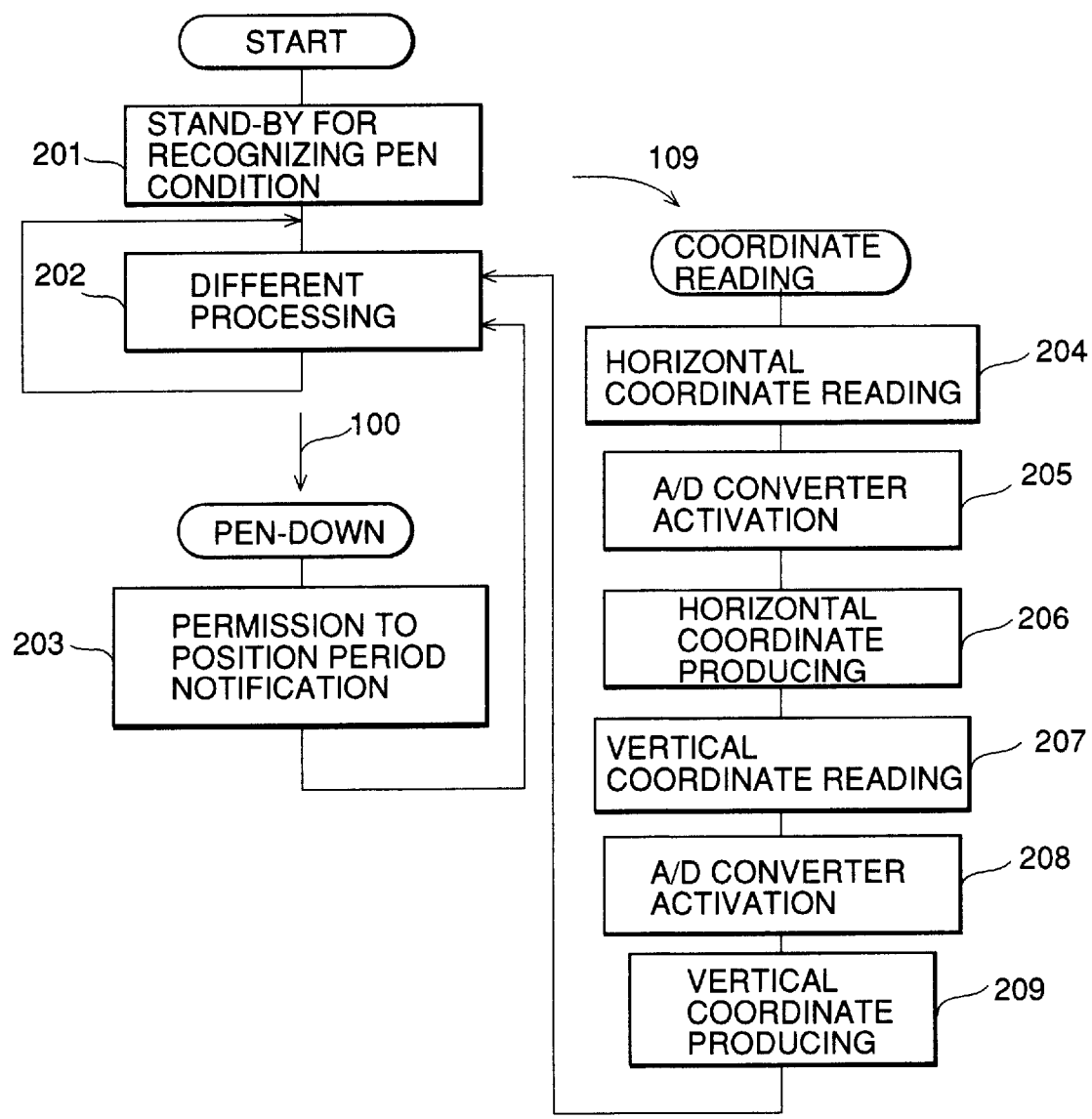
FIG. 12 is a flow chart illustrating as an example how the fourth embodiment of the position reader according to the present invention operates.

In the device shown in FIGS. 10 and 12, the CPU 1 brings the switches 35 and 42 into the on-state, and the switches other than these into the off-state, to thereby set the device to a stand-by state for recognizing the pen condition (step 201). Thereafter, the CPU 1 can perform quite different processing (step 202) such as display control or power source control until the pen-down (the pen-down on the tablet 2) occurs.

Once the pen-down has occurred, as previously described the tablet pen-down detecting signal 100 is fed from the pen-down signal notifying circuit 41 (FIG. 10) to the CPU 1, where the CPU 1 temporarily stops the different processing performed in the step 202 and permits generation of the position period notifying signal 109 (step 203).

In this way, since the CPU 1 is notified of the pen-down through hardware, the CPU 1 is not required to always recognize the pen-down through software and can perform different processing (step 202). The CPU 1 can perform the different processing (step 202) until the position period notifying signal 109 is supplied.

Once the position period notifying signal 109 has been fed to the CPU 1, as previously described the CPU 1 sets horizontal coordinate read processing to perform the horizontal coordinate read processing (step 204). As described with reference to FIG. 1, the CPU 1 converts the horizontal coordinate voltage thus read, into digital data by means of the AID converter 4 (step 205), and takes the data therein to perform an operation to produce a horizontal coordinate of the pen-down point (step 206). Next, the CPU 1 similarly performs vertical coordinate read processing (step 207), converts the vertical coordinate voltage thus read, into digital data by means of the A/D converter 4 (step 208), and takes the data therein to perform an operation to produce a vertical coordinate of the pen-down point (step 209).

After a series of such coordinate read processing operations have been completed, the CPU 1 again performs the different processing (step 202).

In this way, in this fourth embodiment, the pen-down can be recognized with a very small power consumption, and the CPU 1 is not occupied at all in the pen-down recognition, so that the CPU 1 can be released therefrom to carry out different processing.

Since the mask circuit 8, the position read period signal generating circuit 9 and the period notifying circuit 10 are also used, like the embodiment shown in FIG. 1, the device can totally avoid the noise occurring from the display device 5, to make it possible to read the positional coordinate with a high precision.

Figure 13:
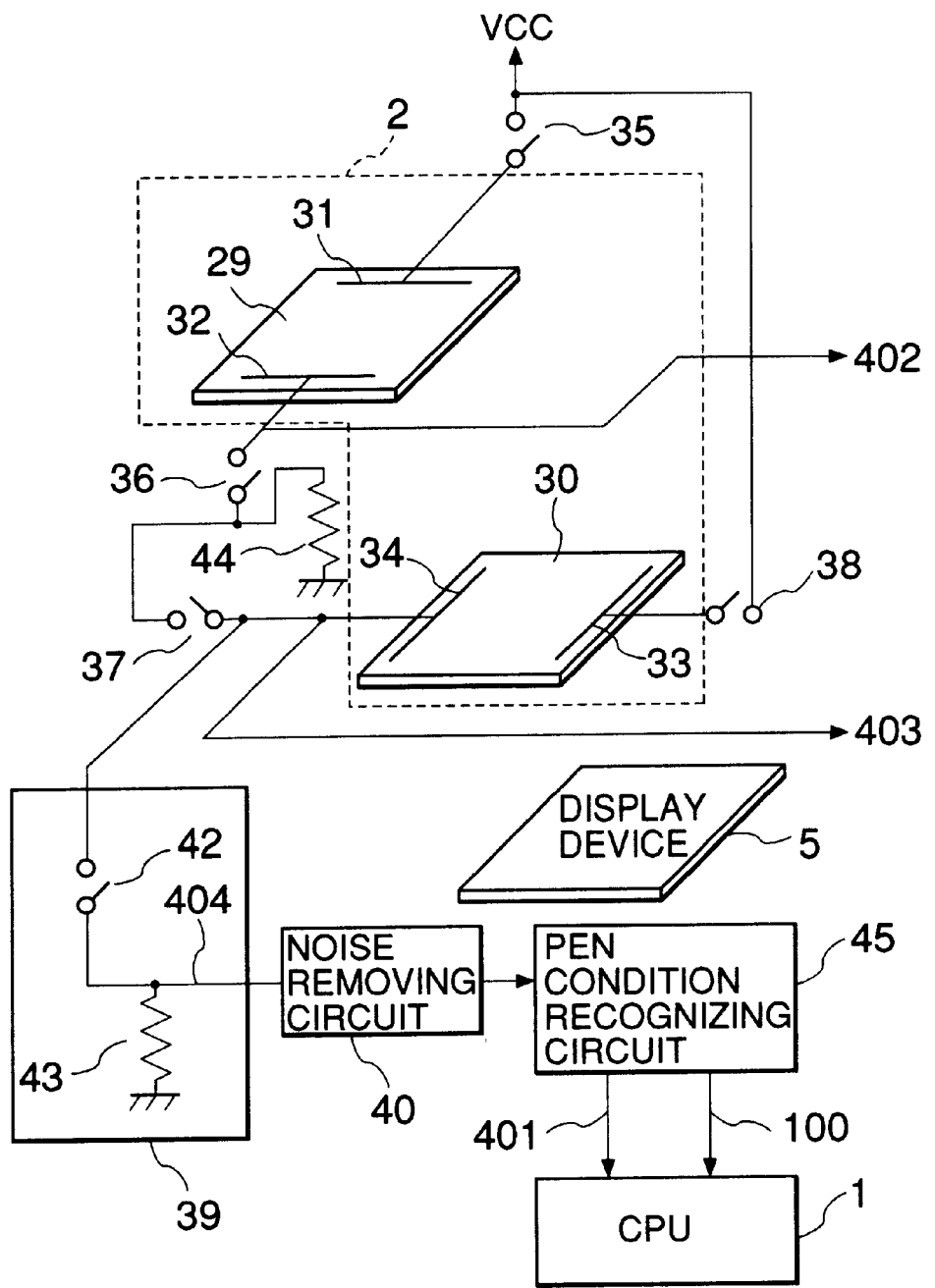
FIG. 13 illustrates the constitution of a fifth embodiment of the position reader according to the present invention.
Figure 14:
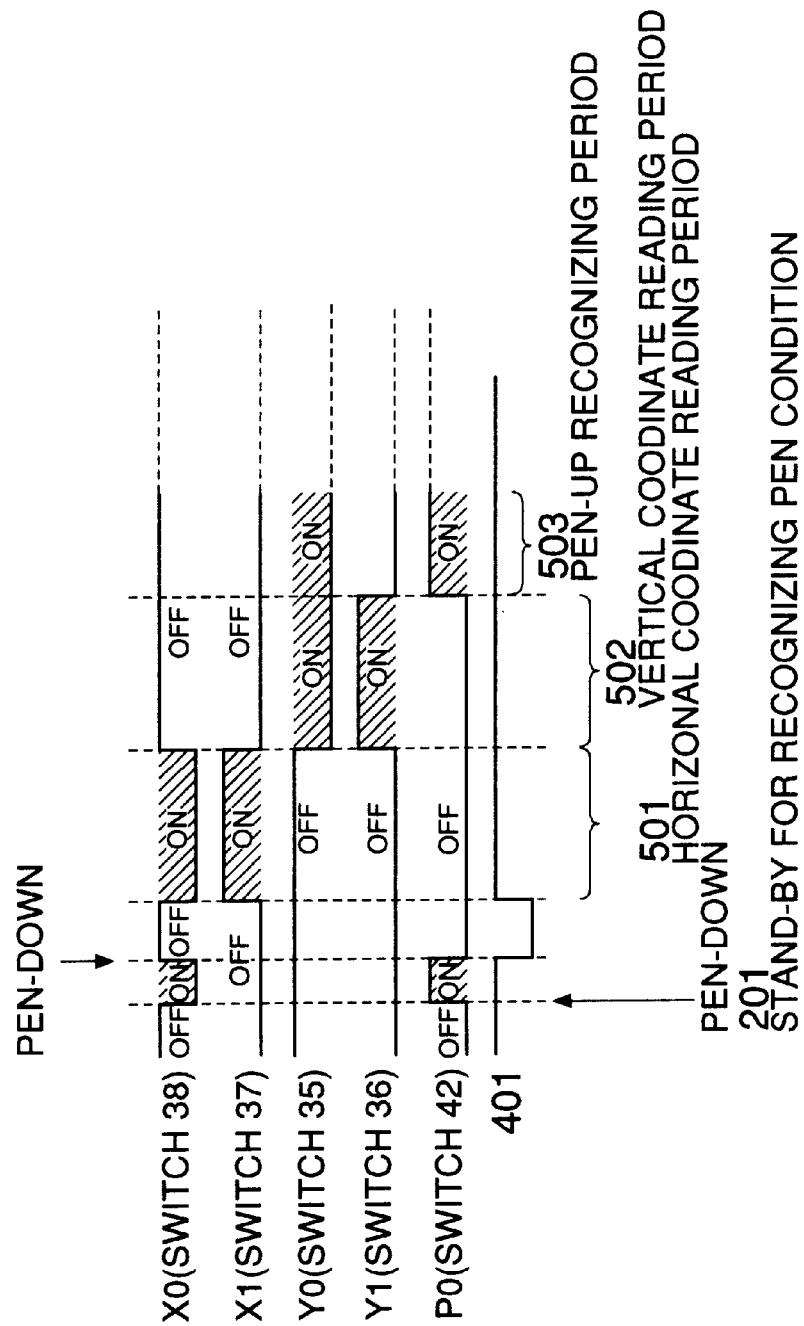
FIG. 14 is a timing chart illustrating as an example how the components shown in FIG. 13 operate.

FIG. 13 illustrates the constitution of a fifth embodiment of the position reader according to the present invention. Reference numeral 45 denotes a pen condition recognizing circuit. Components corresponding to those shown in FIG. 10 are denoted by like reference numerals to avoid repeating the description. This fifth embodiment employs the pen condition recognizing circuit 45 in place of the pen-down signal notifying circuit 41 used in the fourth embodiment shown in FIG. 10. Here, in this fifth embodiment, the coordinates of the pen-down point on the tablet 2 are read in the same manner as in previous embodiments. Accordingly, how the pen condition recognizing circuit 45 characterizing this fifth embodiment operates will be described with reference to FIGS. 13 and 14.

When the tablet is in the state of pen-down, a series of position read processing operations like that in the fourth embodiment are performed. This series of processing operations is comprised of the processing in a horizontal-direction coordinate read processing period 501 and a vertical-direction coordinate read processing period 502. After such position read processing, the processing enters a pen-up recognizing period 503, where the CPU 1 brings the switches 35 and 42 into the on-state. Now, when in the state of pen-down, the pen-down signal 404 is set to "H", and this signal is processed in the noise removing circuit 40 to remove noise and then fed to the pen condition recognizing circuit 45.

In the pen condition recognizing circuit 45, it recognizes from the "H"-state pen-down signal 404 that the tablet is in the state of pen-down, where, for example, the pen condition recognizing signal 401 is set to "H" and then fed to the CPU 1. The CPU 1 recognizes from the "H"-state pen condition recognizing signal 401 that the tablet is kept in the state of pen-down, judges the resultant positional information effective, and performs operations to process the data to calculate the pen-down point on the tablet 2.

When, on the other hand, in the state of pen-up, because of the minute gap left between the vertical-direction transparent resistance film 29 and the horizontal-direction transparent resistance film 30, the vertical-direction transparent resistance film 29 and the horizontal-direction transparent resistance film 30 remain insulated from each other, and no electric current flows across them. Hence, the pen-down signal 404 generated in the resistance 43 remains "L", and the pen-down signal 404 fed to the pen condition recognizing circuit 45 through the noise removing circuit 40 remains "L". Then, the pen condition recognizing circuit 45 sets, for example, the pen condition recognizing signal 401 to "L" to notify the CPU 1 that the tablet is in the state of pen-up. Upon receipt of this notification, the CPU 1 judges whether the positional information obtained immediately before that is effective or ineffective, and performs processing accordingly until the processing of position reading is completed.

Figure 15:
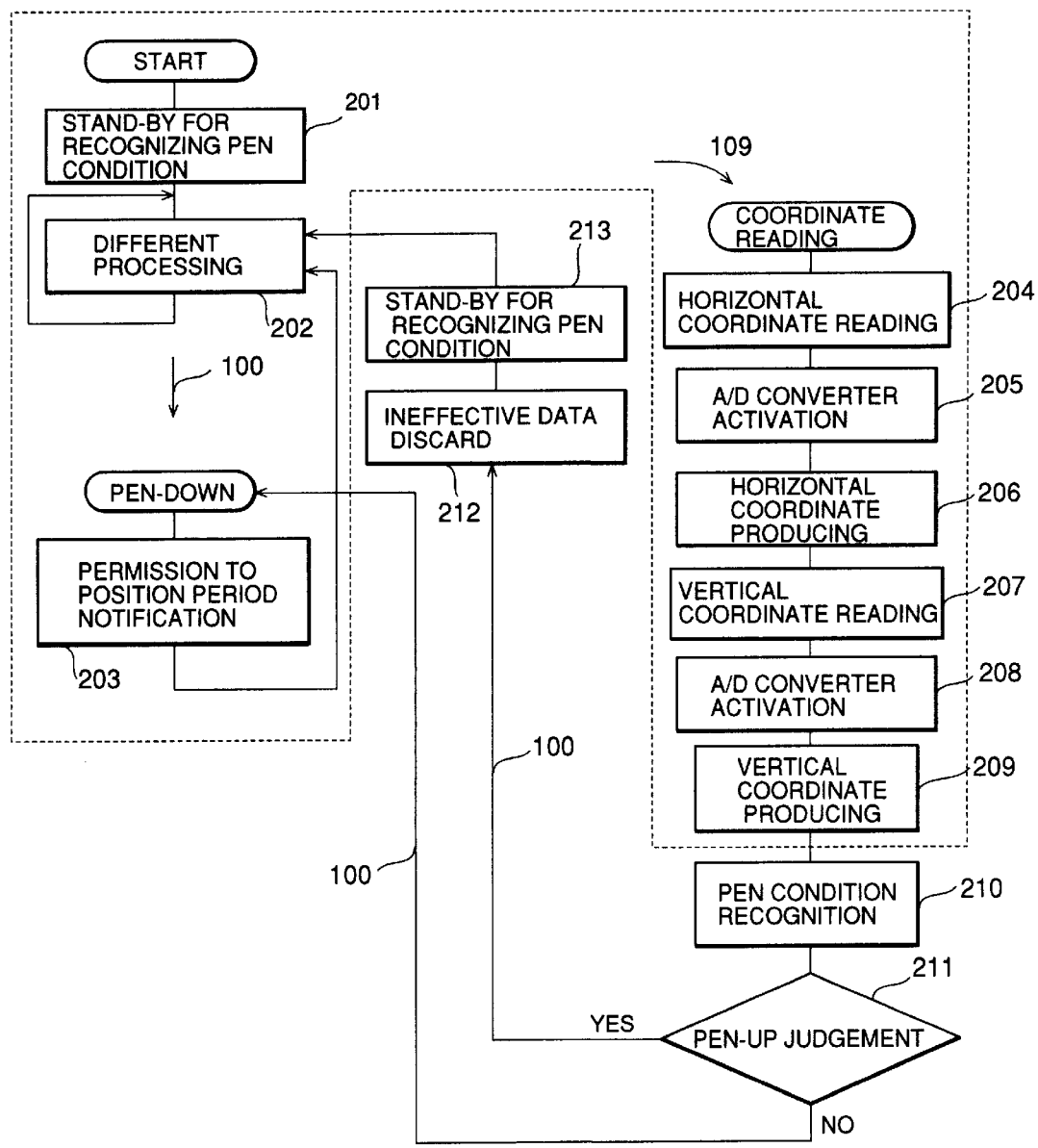
FIG. 15 is a flow chart illustrating as an example how the fifth embodiment of the position reader according to the present invention operates.
Figure 16:
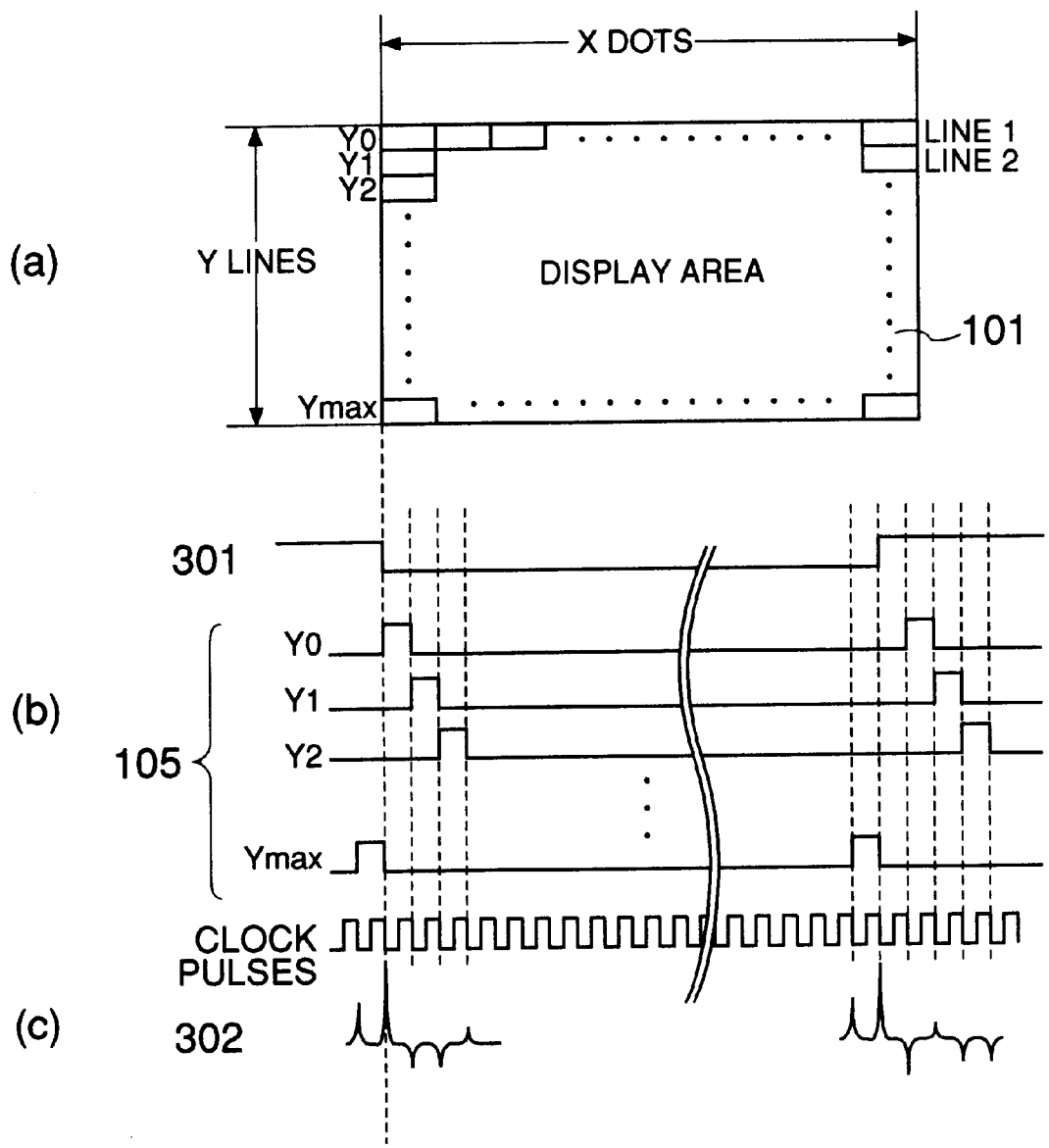
FIG. 16 illustrates as an example how a conventional position reader operates.

An example of how the device of the fifth embodiment operates when the pen-up actually occurs will be described below with reference to FIG. 15. In FIG. 15, the components enclosed in a dotted line operate in the same manner as those in the fourth embodiment. Upon completion of a series of such position read processing operations, the CPU 1 brings the switches 35 and 42 into the on-state and the switches other than these into the off-state, to thereby set the device to a state of pen condition recognition processing (step 210). After this setting, when in the state of pen-down, the "H"-state pen condition recognizing signal 401 is outputted from the pen condition recognizing circuit 45, and the CPU 1 detects that this pen condition recognizing signal 401 has been set to "H" to thereby branch as a result of pen-up judgement processing 211, and recognizes the pen-down to continue the read processing. When in the state of pen-up after the device has been set to the state of pen condition recognizing processing (step 210), the CPU 1 detects that the tablet has entered a pen-up state, as a result of the change of the pen condition recognizing signal 401 from "H" to "L" in the course of the coordinate read processing, and then performs ineffective data discard processing (step 212) in which the data the CPU read immediately before the pen-up are judged to be ineffective data and cancelled.

After the ineffective data discard processing (step 212) has been completed, the CPU 1 further brings the device into a standby state for recognizing the pen condition (step 213). It takes several milliseconds after the pen-down has been detected until the coordinate position read processing is completed. When the pen-up is moved within this several milliseconds, the contact between the resistance films 29 and 30 respectively formed on the top surface and bottom surface of the tablet 2 comes into insufficient contact or non-contact with each other, resulting in poor reliability of the coordinate data obtained at that point in time. To avoid such a difficulty, the pen-up is detected and the ineffective data discard processing (step 212) is performed, as described above, whereby a more highly precise coordinate point of the pen-down position can be determined without wrong coordinate position reading.

In this fifth embodiment, the pen condition recognizing processing (step 210) is performed at the last stage of the coordinate read processing. In the present invention, the order of processing is by no means limited to this. Also, in this fifth embodiment, the pen condition recognizing processing (step 210) is performed once in the course of the coordinate read processing. In the present invention, however, the number of times for the processing is by no means limitative.

The embodiments of the present invention have been described above. The present invention is by no means limited to these embodiments. For example, in the above embodiments, the STN type liquid-crystal display device is used as the liquid-crystal display devices. Without limitation thereto, a TFT (Thin Film Transistor) type liquid-crystal display device may also be used, or display devices other than liquid-crystal display devices may be used.

The system set up is of the type where the tablet is integrated with the display device. Alternatively, the display device and the tablet may be separate, without any problem.

In the above embodiments, the liquid-crystal display device used has a resolution of 480 dots in the horizontal direction and 320 lines in the vertical direction. Without limitation thereto, it is apparent that the resolution may be selected accordingly by changing the values to be set on the horizontal mask period start register, horizontal mask period end register, vertical mask period start register, or vertical mask period end register.

As described above, according to the present invention, it is possible to effectively utilize the throughput of the CPU, to enjoy a significant reduction of power consumption, and to carry out position reading with a good precision by recognizing the state of pen-up to discard ineffective data.

We claim:

1. A position reader comprising:

a display device having a screen;

a display controller that generates display drive signals for driving the display device;

a tablet overlaid on the screen of the display device for serving as an input means, said tablet having horizontal and vertical electrodes dedicated for driving said tablet and;

a drive means for driving the horizontal and vertical electrodes of said tablet; and an analog-to-digital converter that converts an output signal of the tablet into positional information;

wherein a position read period during which the output signal of said tablet is converted into the positional information is provided outside a display period of said display device, and a drive signal of said display device among said display drive signals outputted from said display controller is level-fixed to prevent noise from mixing into the output signal of said tablet so that the position information can be produced.

2. The position reader according to claim 1, wherein said position reader is provided with a means for detecting pen-down on said tablet, and a central processing unit is notified of the pen-down detected by said means.

3. The position reader according to claim 1, wherein said positional information is read plural times within the same position read period.

4. The position reader according to claim 1, wherein said display device comprises a liquid-crystal display device, and, the liquid-crystal display device generates a scanning signal that forms scanning lines which are at least one more than the number of horizontal scanning lines of a display area on the display screen, the output signal of said tablet being converted into said positional information during a period of said at least one scanning line outside said display area.

5. The position reader according to claim 1, wherein a notifying means for recognizing and notifying a start of said position read period is provided, and the notifying means notifies a central processing unit of the result obtained by recognizing the start of said position read period.

6. The position reader according to claim 1, wherein said display device comprises a liquid-crystal display device, and the liquid-crystal display device generates a scanning signal that forms scanning lines which are at least the number of horizontal scanning lines of a display area on the display screen, the output signal of said tablet being converted into said positional information during a predetermined part of the scanning period of each scanning line, said predetermined part of the scanning period being outside a main part of the scanning period which corresponds to the display area of said display screen.

* * * * *